(12) United States Patent
Burton et al.

(10) Patent No.: US 12,514,249 B2
(45) Date of Patent: Jan. 6, 2026

(54) OXALOACETATE AND RELATED COMPOUNDS AS HERBICIDAL AGENTS

(71) Applicant: Verdesian Life Sciences U.S., LLC, Cary, NC (US)

(72) Inventors: Amy Burton, Fuquay-Varina, NC (US); Kuide Qin, Chapel Hill, NC (US); Gary Orr, Pittsboro, NC (US)

(73) Assignee: VERDESIAN LIFE SCIENCES U.S., LLC, Cary, NC (US)

( * ) Notice: Subject to any disclaimer, the term of this patent is extended or adjusted under 35 U.S.C. 154(b) by 580 days.

(21) Appl. No.: 17/913,895

(22) PCT Filed: Mar. 22, 2021

(86) PCT No.: PCT/US2021/023400
§ 371 (c)(1),
(2) Date: Sep. 23, 2022

(87) PCT Pub. No.: WO2021/202134
PCT Pub. Date: Oct. 7, 2021

(65) Prior Publication Data
US 2023/0309558 A1 Oct. 5, 2023

Related U.S. Application Data

(60) Provisional application No. 63/001,683, filed on Mar. 30, 2020.

(51) Int. Cl.
*A01N 37/42* (2006.01)
*A01P 13/00* (2006.01)

(52) U.S. Cl.
CPC .............. *A01N 37/42* (2013.01); *A01P 13/00* (2021.08)

(58) Field of Classification Search
CPC ................................ A01N 37/42; A01P 13/00
See application file for complete search history.

(56) References Cited

U.S. PATENT DOCUMENTS

| 2005/0215435 A1 | 9/2005 | Menges et al. |
| 2019/0119193 A1 | 4/2019 | Starikov |

FOREIGN PATENT DOCUMENTS

| CN | 1686966 A | 10/2005 |
| JP | 01139566 A | 6/1989 |
| UA | 19812 A | 12/1997 |
| UA | 19840 A | 12/1997 |

*Primary Examiner* — Trevor Love
(74) *Attorney, Agent, or Firm* — Katten Muchin Rosenman LLP

(57) ABSTRACT

The present invention is directed to methods of controlling the growth of undesired vegetation in a particular area by using an herbicidal composition that contains an esterified plant metabolite.

17 Claims, 1 Drawing Sheet

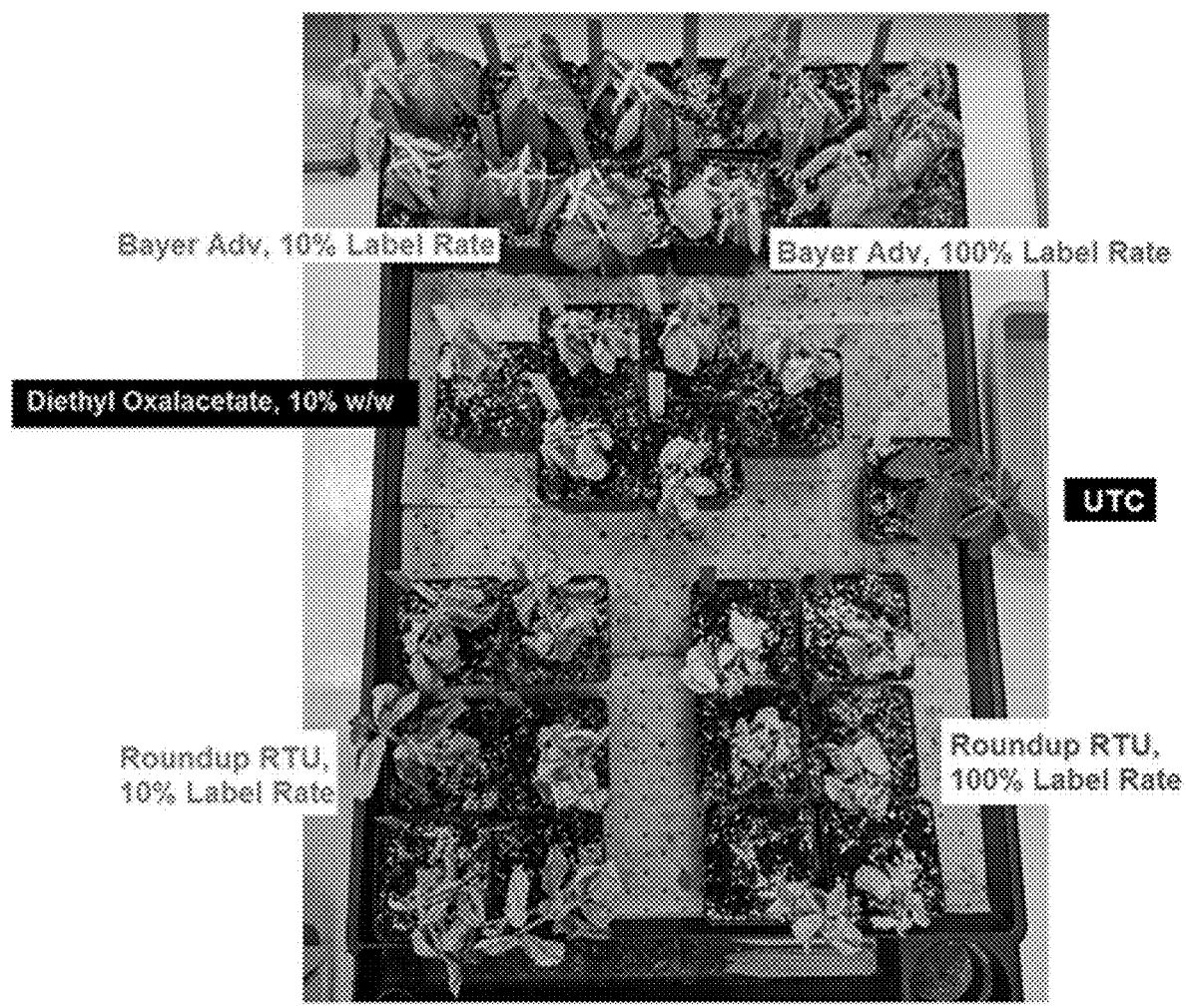

OXALOACETATE AND RELATED COMPOUNDS AS HERBICIDAL AGENTS

CROSS-REFERENCE TO RELATED APPLICATIONS

This application is a U.S. National Stage Entry Application of International Application No. PCT/US2021/023400 filed Mar. 22, 2021, which claims the benefit of U.S. Provisional Patent Application No. 63/001,683 filed Mar. 30, 2020, each of which is herein incorporated by reference in its entirety for all purposes.

FIELD OF THE INVENTION

The presently disclosed subject matter is directed to herbicidal compositions containing esters derived from plant metabolite oxaloacetate, which find particular utility in agricultural uses to prevent growth of undesired vegetation (e.g., weeds) in fields of crops.

BACKGROUND

Modern herbicides make major contributions to global food production by easily removing weeds and substituting for destructive soil cultivation. However, an unfortunate outcome of the reliance on herbicides is the evolution of herbicide resistance in weeds, as a once susceptible population is no longer controlled by a particular herbicide. Generally, resistance evolves in weeds when a plant survives at a dose of herbicide that is normally lethal to its wild type. A typical reason for weeds becoming resistant to herbicides is a lack of rotation of the herbicides, particularly herbicides with long residue periods.

In addition, the utility of herbicides themselves is being threatened by the appearance of herbicide-resistant weeds as global weed species are accumulating resistance mechanisms, displaying multiple resistance across many herbicides, and posing a great challenge to herbicide sustainability in world agriculture.

A particular herbicide of interest is glyphosate, which is the most widely used and successful herbicide discovered to date, but its utility is now threatened by the occurrence of several glyphosate-resistant weed species. Glyphosate-resistant weeds first appeared in *Lolium rigidum* in an apple orchard in Australia in 1996, ironically the year that the first glyphosate-resistant crop (soybean) was introduced in the USA. Thirty-eight weed species have now evolved resistance to glyphosate, distributed across 37 countries and in 34 different crops and six non-crop situations. Although glyphosate-resistant weeds have been identified in orchards, vineyards, plantations, cereals, fallow and non-crop situations, it is the glyphosate-resistant weeds in glyphosate-resistant crop systems that dominate, causing a growing economic impact. Glyphosate-resistant weeds present the greatest threat to sustained weed control in major agronomic crops because glyphosate is used to control weeds with resistance to herbicides with other sites of action, and no new herbicides with alternate sites of action have been introduced for over 30 years. The industry has responded by developing herbicide resistance traits in major crops that allow existing herbicides to be used in a new way. However, over-reliance on these traits will result in multiple herbicide resistance in weeds.

Thus, despite the continuous ongoing research efforts to improve upon existing herbicidal products, there still remains a significant need in the art for developing better methods and herbicidal agents that can be used in current and future weed management technologies.

SUMMARY OF THE INVENTION

The current disclosure relates to compositions comprising oxaloacetate and derivatives thereof that when present at high concentrations exhibit potent herbicidal activity. This observation was totally surprising and unexpected considering that oxaloacetate is known as a plant growth regulator (i.e., growth stimulator) but was not known to exhibit any herbicidal activity.

In one aspect, the subject matter described herein is directed to a method of controlling the growth of undesired vegetation in a target area, the method comprising applying to the target area an herbicidally effective amount of an herbicidal composition comprising an oxaloacetate compound of formula (I):

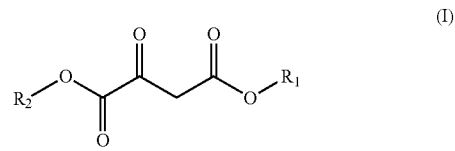

wherein $R_1$ and $R_2$ are independently selected from substituted or unsubstituted $C_1$-$C_8$ alkyl groups and $C_2$-$C_5$ alkenyl groups; or an agriculturally acceptable salt form thereof. For example, in some embodiments, $R_1$ and $R_2$ are independently selected from methyl, ethyl, n-propyl and iso-propyl. In another example, the agriculturally acceptable salt form can be a mono-salt from where the corresponding cation is selected from an alkali metal such as lithium, sodium, potassium, cesium, and a combination thereof. In some cases the agriculturally acceptable salt can also be a di-salt form where the salt is a divalent cation such as an alkaline earth metal (e.g., magnesium, calcium, and a combination thereof) or a transition metal (e.g., manganese, iron, cobalt, nickel, copper, zinc, and a combination thereof). The divalent cation is present in a ratio of 2:1 (compound: divalent cation).

The herbicidal composition can be a non-selective herbicidal composition or can be a selective herbicidal composition. For non-selective herbicidal composition, this type of herbicidal composition is applied to the soil of the target area containing no crops of cultivated plants or containing crops of cultivated plants that have not yet emerged using a broadcast application method. For selective herbicidal composition, this type of herbicidal composition is selectively applied to the plants of the unwanted vegetation to leave the crops of cultivated plants uninjured using a directed application and/or a spot application methods.

Examples of crops of cultivated plants are barley, wheat, rye, oats, maize, rice, sorghum, triticale, cotton, oilseed rape, sunflower, maize, rice, soybeans, sugar beet, sugar cane, beet, sugar beet, fodder beet, pomes, stone fruit, apples, pears, plums, peaches, almonds, cherries, strawberries, raspberries, blackberries, beans, lentils, peas, soybeans, peanuts, rape, mustard, sunflowers, cotton, flax, hemp, jute, spinach, lettuce, asparagus, cabbages, carrots, onions, tomatoes, potatoes, sweet potatoes, yams, paprika, winter wheat, spring wheat, winter barley, spring barley, triticale, cereal rye, winter durum wheat, spring durum wheat, winter oat, spring oat, fodder cereals, ray-grass, cocksfoot, fescue, timothy, and combinations thereof.

Examples of the unwanted vegetation in the method disclosed herein are monocotyledonous selected from the group of genera consisting of *Agrostis* spp., *Alopecurus* spp., *Apera* spp., *Avena* spp., *Brachiaria* spp., *Bromus* spp., *Digitaria* spp., *Echinochloa* spp., *Eleusine* spp., *Eriochloa* spp., *Leptochloa* spp., *Lolium* spp., *Ottochloa* spp., *Panicum* spp., *Paspalum* spp., *Phalaris* spp., *Poa* spp., *Rottboelia* spp., *Setaria* spp., *Sorghum* spp., *Commelina* spp., *Monochoria* spp., *Sagittaria* spp. and sedges such as *Cyperus* spp. and *Scirpus* spp. and/or dicotyledonous selected from the group of genera consisting of *Abutilon* spp., *Ambrosia* spp., *Amaranthus* spp., *Chenopodium* spp., *Erysimum* spp., *Euphorbia* spp., *Fallopia* spp., *Galium* spp., *Hydrocotyle* spp., *Ipomoea* spp., *Lamium* spp., *Medicago* spp., *Oxalis* spp., *Plantago* spp., *Polygonum* spp., *Richardia* spp., *Sida* spp., *Sinapis* spp., *Solanum* spp., *Stellaria* spp., *Taraxacum* spp., *Trifolium* spp., *Veronica* spp., *Viola* spp. and *Xanthium* spp.

Even glyphosate-resistant weeds selected from the group consisting of rigid ryegrass, horseweed (marestail), Italian ryegrass, common ragweed, palmer amaranth, waterhemp, goosegrass, hairy fleabane, broadleaf plantain, johnsongrass, and wild poinsettia are considered unwanted vegetation.

The herbicidal composition used in the method disclosed herein can further be combined with a pesticide, an herbicide, or a fertilizer.

BRIEF DESCRIPTION OF THE DRAWINGS

FIG. 1 shows a picture of plants that were treated with Bayer Advanced (10% and 100% Label Rate); Diethyl Oxaloacetate (10% w/w); UTC (UTC stands for untreated control); and Roundup RTU (RTU stands for ready-to-use) (10% and 100% Label Rate).

DETAILED DESCRIPTION

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

In crop protection, it is desirable to control undesired vegetation (e.g., weeds) effectively and, at the same time, minimize the environmental impact of herbicidal compounds used for weed control. The extensive use of herbicide products like glyphosate (the active ingredient in commercially available product Roundup®, marketed by Monsanto) and/or 2,4-dimethylamine salt (the active ingredient in commercially available product Bio Advanced® (also called BioAdvanced®), marketed by Bayer) has caused adverse environmental and human safety problems. Furthermore, glyphosate-resistant weeds have become increasingly widespread, causing serious problems for efficient weed control because the weed control by the application of known herbicides is no longer effective.

Thus, there is need for novel environmentally friendly compounds and methods to effectively control weeds, particularly herbicide-resistant weeds in agricultural production and other uses (e.g., horticulture, turf, ornamental, home and garden). Monsanto's and Bayer's weed killers also affect surrounding ecosystems where Roundup® and/or BioAdvanced® are actively sprayed. Runoff from farms can permeate neighboring water systems and contaminate water supplies, including tap water. When a glyphosate and/or 2,4-dimethylamine salt and rainwater mix flows from farmlands and residential neighborhoods into nearby streams, rivers, and lakes, the chemical also disrupts these aquatic ecosystems. This contamination affects the wild creatures and plant life that require these habitats to survive.

To this end, it has been advantageously discovered that the compositions and methods described herein modulate the growth of undesired vegetation when administered in herbicidally effective amounts. In particular, the compositions as described herein contain an ester form of a natural plant metabolite oxaloacetate. In plants, oxaloacetate is an important component in the glyoxylate cycle that is responsible for the production of carbohydrates, a key component of plants.

Recently, compositions containing esters of oxaloacetic acid (i.e., oxaloacetate esters) at concentrations ranging from $10^{-11}$ M to $10^{-3}$ M were identified as being useful plant growth regulators (US 2019/0119193). At these concentrations, the oxaloacetate esters improve the growth of plants and effectively act as plant fertilizers. Complexation of these esters of oxaloacetic acid with metals (e.g., Ni) were was also reported to act as plant growth regulators (Ukrainian Patent Nos.: 19840 and 19812). However, no reports disclose any herbicidal activities of oxaloacetic acid, oxaloacetate, or any salts or ester variations thereof.

By contrast, the current disclosure relates to compositions comprising esters of oxaloacetate that when present at high concentrations exhibit potent herbicidal activity. Not to be bound by theory, but it is believed that the herbicidal activity of the disclosed herbicidal compositions is due to the inhibition of one or more enzymes in the weed plant that ultimately results in the killing of the weed plant. Such an observation was totally surprising and unexpected considering that oxaloacetate is known as a plant growth regulator (i.e., growth stimulator) but was not known to exhibit any herbicidal activity. The herbicidal compositions disclosed herein are described in more detail below.

Definitions

As used herein, the term "crop" includes reference to a whole plant, plant organ (e.g., leaves, stems, twigs, roots, trunks, limbs, shoots, fruits, etc.), plant cells, or plant seeds. This term also encompasses plant crops such as fruits.

As used herein, the phrase "agriculturally acceptable carrier" refers to carriers that are known and accepted in the art for the formation of formulations for agricultural or horticultural use.

As used herein, the phrase "agriculturally acceptable salt form" refers to salts that are known and accepted in the art for the compositions and formulations for agricultural or horticultural use.

As used herein, the term "control of undesirable vegetation" refers to the interference with the normal growth and development of undesired vegetation. Examples of control activity include, but are not limited to, inhibition of root growth, inhibition of shoot growth, inhibition of shoot emergence, inhibition of seed production, or reduction of weed biomass.

As used herein, the term "herbicidally effective amount" indicates the quantity of such a compound/composition or combination of such compounds and/or compositions, which is capable of producing a controlling effect on the growth of plants. Disclosed herein are herbicidal compositions and/or oxaloacetate compounds, which are capable of producing a controlling effect on the growth of unwanted vegetation as is described in more detail below. A skilled artisan is well aware of the fact that such an amount can vary in a broad range and is dependent on various factors, e.g., weather, target species, locus, mode of application, soil type, treated crop, climatic conditions and the like.

As used herein, the term "controlling effects" includes all deviation from natural development, for example: killing, retardation, leaf burn, albinism, dwarfing and the like. For example, plants that are not killed are often stunted and noncompetitive with flowering disrupted.

As used herein, the term "pesticide" refers to a substance that is meant to control pests. The term pesticide includes all of the following: insecticides (which may include insect include growth regulators, termiticides, etc.), nematicide, molluscicide, piscicide, avicide, bactericide, insect repellent, animal repellent, antimicrobial, and fungicide.

As used therein, the term "herbicide" refers to any known substances used to control unwanted vegetation. In general, herbicides (often called weed killers) are grouped into "selective" herbicides and "non-selective" herbicides. Selective herbicides control specific species of unwanted vegetation, while leaving the desired crop relatively unharmed, while non-selective herbicides (sometimes called total weed killers) can be used to clear waste ground, industrial and construction sites, railways and railway embankments as they kill all plant material with which they come into contact.

As used herein, the term "unwanted vegetation" refers to any plant that is considered undesirable in a particular situation, such as a plant out of place, or a plant that is more detrimental than beneficial. Such plants are also often referred to as weeds.

As used herein, the term "uninjured" refers to plants that did not suffer a plant injury due to an external irritant. A plant injury is an abrupt alteration of form or function caused by a discontinuous external irritant such as insects, animals, and physical, chemical or environmental agents/toxins. Herein in particular the term "uninjured" refers to plants that were exposed to the herbicidal composition as disclosed herein (considered an external irritant) which did not result in any plant injuries.

As used herein, the term "insecticide" refers to any substance used to kill insects.

As used herein, the term "larvicide" refers to an insecticide that is specifically targeted against the larval life stage of an insect.

As used herein, the term "bactericide" refers to any substance used to kill bacteria.

As used herein, the term "acaricide" refers to any substance used to kill members of the arachnid subclass Acari, which includes ticks and mites.

As used herein, the term "nematocide" refers to any substance used to kill nematodes.

As used herein, the term "molluscicide" refers to any substance used to kill mollusks.

As used herein, the term " "miticide" refers to any substance used to kill mites.

As used herein, the term "plant growth regulator" refers to any substance or mixture of substances intended, through physiological action, to accelerate or retard the rate of growth or maturation, or otherwise alter alters the behavior of plants or their produce As used herein, the term "monocotyledons" refers to monocots that are flowering plants (angiosperms), the seeds of which typically contain only one embryonic leaf, or cotyledon. They constitute one of the major groups into which the flowering plants have traditionally been divided, the rest of the flowering plants having two cotyledons and therefore classified as dicotyledons, or dicots. However, molecular phylogenetic research has shown that while the monocots form a monophyletic group or clade (comprising all the descendants of a common ancestor), the dicotyledons do not. The monocotyledons include about 60,000 species. The largest family in this group (and in the flowering plants as a whole) by number of species are the orchids (family Orchidaceae), with more than 20,000 species. About half as many species belong to the true grasses (Poaceae), which are economically the most important family of monocotyledons. In agriculture the majority of the biomass produced comes from monocotyledons. These include not only major grains (rice, wheat, maize, etc.), but also forage grasses, sugar cane, and the bamboos. Other economically important monocotyledon crops include various palms (Arecaceae), bananas and plantains (Musaceae), gingers and their relatives, turmeric and cardamom (Zingiberaceae), asparagus (Asparagaceae), pineapple (Bromeliaceae), water chestnut (Cyperaceae), and leeks, onion and garlic (Amaryllidaceae). Many houseplants are monocotyledon epiphytes. Additionally most of the horticultural bulbs, plants cultivated for their blooms, such as lilies, daffodils, irises, amaryllis, cannas, bluebells and tulips, are monocotyledons.

As used herein, the term "dicotyledons" refers to any of various flowering plants that are not monocotyledons, having two cotyledons in the seed and usually flower parts in multiples of four or five, leaves with reticulate venation, pollen with three pores, and the capacity for secondary growth. The dicotyledons, which include the eudicotyledons and the magnoliids, are no longer considered to form a single valid taxonomic group. Dicotyledons are also known as dicots (or more rarely dicotyls), and the most typical characteristics of this group is are that the seed has two embryonic leaves or cotyledons. There are around 200,000 species within this group.

As used herein, the term "soil" is to be understood as a natural body comprised of living (e.g., microorganisms (such as bacteria and fungi), animals, and plants) and nonliving matter (e.g., minerals and organic matter (e.g., organic compounds in varying degrees of decomposition), liquid, and gases) that occurs on the land surface and is characterized by soil horizons that are distinguishable from the initial material as a result of various physical, chemical, biological, and anthropogenic processes. From an agricultural point of view, soils are predominantly regarded as the anchor and primary nutrient base for plants (plant habitat).

As used herein, the term "fertilizer" is to be understood as chemical compounds applied to promote plant and fruit growth. Fertilizers are typically applied either through the soil (for uptake by plant roots) or by foliar feeding (for uptake through leaves). The term "fertilizer" can be subdivided into two major categories: a) organic fertilizers (composed of decayed plant/animal matter) and b) inorganic fertilizers (composed of chemicals and minerals). Organic fertilizers include manure, slurry, worm castings, peat, seaweed, sewage, and guano. Green manure crops are also regularly grown to add nutrients (especially nitrogen) to the soil. Manufactured organic fertilizers include compost, blood meal, bone meal, and seaweed extracts. Further examples are enzymatically digested proteins, fish meal, and feather meal. The decomposing crop residue from prior years is another source of fertility. In addition, naturally occurring minerals such as mine rock phosphate, sulfate of potash, and limestone are also considered inorganic fertilizers. Inorganic fertilizers are usually manufactured through chemical processes (such as the Haber-Bosch process), also using naturally occurring deposits, while chemically altering them (e.g., concentrated triple superphosphate). Naturally occurring inorganic fertilizers include Chilean sodium nitrate, mine rock phosphate, and limestone.

As used herein, the term "manure" is organic matter used as organic fertilizer in agriculture. Depending on its structure, manure can be divided into liquid manure, semi-liquid manure, stable or solid manure, and straw manure. Depending on its origin, manure can be divided into manure derived from animals or plants. Common forms of animal manure include feces, urine, farm slurry (liquid manure), or farmyard manure (FYM), whereas FYM also contains a certain amount of plant material (typically straw), which may have been used as bedding for animals. Animals from which manure can be used comprise horses, cattle, pigs, sheep, chickens, turkeys, rabbits, and guano from seabirds and bats. The application rates of animal manure when used as fertilizer highly depends on the origin (type of animals). Plant manures may derive from any kind of plant, whereas the plant may also be grown explicitly for the purpose of plowing them in (e.g., leguminous plants), thus improving the structure and fertility of the soil. Furthermore, plant matter used as manure may include the contents of the rumens of slaughtered ruminants, spent hops (left over from brewing beer), or seaweed.

As used herein, the term "emulsifiable concentrate" refers to liquid formulations with an active ingredient that is dissolved in one or more petroleum-based solvents. An emulsifier is added to cause oil to form tiny globules that disperse in water. The formulation then will mix readily with water for proper application. Emulsifiable concentrates usually contain between 2 and 8 pounds of active ingredient per gallon.

As used herein, the term "wettable powder" refers to finely ground, dry particles that may be dispersed and suspended in water. They typically contain from about 25% to 80% active ingredient. Suspensions of wettable powders appear cloudy. Wettable powders are nearly insoluble and require agitation to remain in suspension.

As used herein, the term "dry flowables" also called "water-dispersible granules (WDG or WG) or dispersible granules (DG)" refers to wettable powders formed into prills so they pour easily into the sprayer tank without clumping or producing a cloud of dust. Nearly insoluble, they require agitation to remain in suspension.

As used herein, the terms "flowables" and/or "suspension concentrates" and/or "aqueous suspension" refer to finely ground, wettable powders or solids already suspended in a liquid carrier so they can be poured or pumped from one tank to another. They usually contain at least about 4 pounds of active ingredient per gallon of formulation. Flowables are nearly insoluble in water and require agitation to remain in suspension.

As used herein, the terms "microencapsulated suspension" and/or "capsule suspension" refer to herbicides that are encased in extremely small capsules that can be suspended in a liquid carrier and pumped and applied with normal equipment. Microencapsulated formulations are nearly insoluble in water and require agitation to remain in suspension and allows for the active ingredient to be slowly released over a period of time. This extends the soil activity and improves weed control.

As used herein, the term "pellets" refers to granule-like entities but are compressed into larger cylinders about V4 inch long. Herbicides formulated as pellets usually contain from about 5% to 20% active material and are hand-applied to control clumps of brush. They also may be applied with cyclone-type spinner spreaders mounted on helicopters or aircraft to control brush in forests or permanent pastures. Pellets gradually break down from rainfall and leach into the soil for root uptake.

As used herein, the term "water soluble powder" refers to dry soluble powders (DS) from true solutions in water and require no agitation.

As used herein, the term "ultra-low-volume concentrate" refers to the active ingredient in its original liquid form and is typically applied without further dilution in special aerial or ground equipment at rates of 1.5 pint to 1.5 gallon per acre as an extremely fine spray.

As used herein, the term "premixes" refers not to formulations, but rather to two or more herbicide active ingredients mixed into one product by the manufacturer. The actual formulation can be any of those discussed above and commonly combines two or more herbicides that are already used together. The primary reason for using premixes is convenience.

As used herein, the term "alkyl group" refers to a saturated hydrocarbon radical containing 1 to 8, 1 to 6, 1 to 4, or 5 to 8 carbons. An alkyl group is structurally similar to a noncyclic alkane compound modified by the removal of one hydrogen from the noncyclic alkane and the substitution therefore of a non-hydrogen group or radical. Alkyl group radicals can be branched or unbranched. Lower alkyl group radicals have 1 to 4 carbon atoms. Higher alkyl group radicals have 5 to 8 carbon atoms. Examples of alkyl, lower alkyl, and higher alkyl group radicals include, but are not limited to, methyl, ethyl, n-propyl, iso-propyl, n-butyl, sec-butyl, t-butyl, amyl, t-amyl, n-pentyl, n-hexyl, i-octyl and like radicals.

As used herein, the term "alkenyl group" refers to an unsaturated hydrocarbon radical containing 1 to 8, 1 to 6, 1 to 4, or 5 to 8 carbons and at least one carbon-carbon double bond. The unsaturated hydrocarbon radical is similar to an alkyl radical as defined above that also comprises at least one carbon-carbon double bond. Examples include, but are not limited to, vinyl, allyl, 2-butenyl, 3-butenyl, 2-pentenyl, 3-pentenyl, 4-pentenyl, 2-hexenyl, 3-hexenyl, 4-hexenyl, 5-hexenyl, 2-heptenyl, 3-heptenyl, 4-heptenyl, 5-heptenyl, 6-heptenyl and the like. The term "alkenyl" includes dienes and trienes of straight and branch chains.

As used herein, the term "substituted" refers to a moiety (such as heteroaryl, aryl, alkyl, and/or alkenyl) wherein the moiety is bonded to one or more additional organic or inorganic substituent radicals. In some embodiments, the substituted moiety comprises 1, 2, 3, 4, or 5 additional substituent groups or radicals. Suitable organic and inorganic substituent radicals include, but are not limited to, hydroxyl, cycloalkyl, aryl, substituted aryl, heteroaryl, heterocyclic ring, substituted heterocyclic ring, amino, monosubstituted amino, di-substituted amino, acyloxy, nitro, cyano, carboxy, carboalkoxy, alkyl carboxamide, substituted alkyl carboxamide, dialkyl carboxamide, substituted dialkyl carboxamide, alkylsulfonyl, alkylsulfinyl, thioalkyl, alkoxy, substituted alkoxy or haloalkoxy radicals, wherein the terms are defined herein. Unless otherwise indicated herein, the organic substituents can comprise from 1 to 4 or from 5 to 8 carbon atoms. When a substituted moiety is bonded thereon with more than one substituent radical, then the substituent radicals may be the same or different.

As used herein, the term "unsubstituted" refers to a moiety (such as heteroaryl, aryl, alkenyl, and/or alkyl) that is not bonded to one or more additional organic or inorganic substituent radical as described above, meaning that such a moiety is only substituted with hydrogens.

As used herein, the term "aryl" refers to a radical comprising at least one unsaturated and conjugated six-membered ring analogous to the six-membered ring of benzene. Aryl radicals having such unsaturated and conjugated rings are also known to those of skill in the art as "aromatic" radicals. Preferred aryl radicals have 6 to 12 ring carbons. Aryl radicals include, but are not limited to, aromatic radicals comprising phenyl and naphthyl ring radicals.

As used herein, the term "heteroaryl" refers to a radical that comprises at least a five membered or six-membered unsaturated and conjugated aromatic ring containing at least two ring carbon atoms and one to four ring heteroatoms selected from nitrogen, oxygen, and/or sulfur. Such heteroaryl radicals are often alternatively termed "heteroaromatic" by those of skill in the art. In some embodiments, the heteroaryl radicals have from two to twelve carbon atoms, or alternatively four to five carbon atoms in the heteroaryl ring. Examples include, but are not limited to, pyridinyl, pyrimidinyl, pyrazinyl, pyrrolyl, furanyl, tetrazolyl, isoxazolyl, oxadiazolyl, benzothiophenyl, benzofuranyl, quinolinyl, isoquinolinyl and the like.

As used herein, the term "regioisomer" refers to structural isomerism where molecules with the same molecular formula have bonded together in a different order. For example, a functional group (e.g., a cation) or other substituent changes position on a parent structure (e.g., oxaloacetate compound) while the basic carbon skeleton remains unchanged.

As used herein, the term "E configuration" and "Z configuration" refer to describing the absolute stereochemistry of double bonds contained in organic compound using the Cahn-Ingold-Prelog priority rules (CIP rules) and is often referred to as the "cis" and "trans" olefins, respectively. Following the Cahn-Ingold-Prelog priority rules (CIP rules), each substituent on a double bond is assigned a priority, then positions of the higher of the two substituents on each carbon are compared to each other. If the two groups of higher priority are on opposite sides of the double bond (trans to each other), the bond is assigned the configuration E (from entgegen, German: [ɛntˈgeːgən ], the German word for "opposite"). If the two groups of higher priority are on the same side of the double bond (cis to each other), the bond is assigned the configuration Z (from zusammen, German: [tsuˈzamən ], the German word for "together"):

As used herein, the term "enantiomer" refers to one of two stereoisomers that are mirror images of each other that are non-superposable (not identical), much as one's left and right hands are mirror images of each other that cannot appear identical simply by reorientation. Note that stereoisomers are molecules, which have the same molecular formula and sequence of bonded atoms (constitution), but differ in the three-dimensional orientations of their atoms in space.

As used herein, the term "enantiomerical purity" also often called "enantiomeric excess" (ee) is a measurement of purity used for chiral substances. It reflects the degree to which a sample contains one enantiomer in greater amounts than the other. A racemic mixture has an ee of 0%, while a single completely pure enantiomer has an ee of 100%. A sample with 70% of one enantiomer and 30% of the other has an ee of 40% (70%-30%).

As used herein, the term "diasteroisomers" refer to stereoisomers that are not related through a reflection operation. They are not mirror images of each other. These include meso compounds, cis-trans isomers, E-Z isomers, and non-enantiomeric optical isomers. Diastereomers seldom have the same physical properties.

As used herein, the term "diastereomerical purity" also often called "diastereomeric excess" (de) exists when one diastereomer is present in a larger amount than the other in a chemical substance.

Throughout this specification and the claims, the words "comprise," "comprises," and "comprising" are used in a nonexclusive sense, except where the context requires otherwise, and are synonymous with "including," "containing," or "characterized by," meaning that it is open-ended and does not exclude additional, unrecited elements or method steps.

As used herein, the transitional phrase "consisting essentially of" limits the scope of a claim to the specified materials or steps "and those that do not materially affect the basic and novel characteristic(s)" of the claimed invention.

As used therein, the transitional phrase "consisting of" excludes any element, step, or ingredient not specified in the claim.

As used herein, the term "about," when referring to a value, is meant to encompass variations of, in some embodiments ±5%, in some embodiments ±2%, in some embodiments ±1%, in some embodiments ±0.5%, and in some embodiments ±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller ranges are also encompassed, subject to any specifically excluded limit in the stated range. Where the stated range includes one or both of the limits, ranges excluding either or both of those included limits are also included.

Additional Definitions May Follow Below

I. Composition

The current disclosure relates to compositions comprising oxaloacetate and derivatives thereof that when present at high concentrations exhibit potent herbicidal activity. This observation was totally surprising and unexpected considering that oxaloacetate is known as a plant growth regulator (i.e., growth stimulator) but was not known to exhibit any herbicidal activity.

The herbicidal composition disclosed herein comprises an oxaloacetate compound of formula (I):

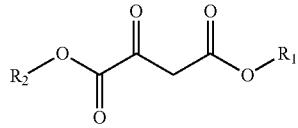

(I)

wherein $R_1$ and $R_2$ are independently selected from substituted or unsubstituted $C_1$-$C_8$ alkyl groups and substituted or unsubstituted $C_2$-$C_8$ alkenyl groups; or an agriculturally acceptable salt form thereof, wherein the oxaloacetate compound is present in the herbicidal composition in an herbicidally effective amount.

In some embodiments, $R_1$ and $R_2$ are independently selected from substituted or unsubstituted $C_1$-$C_8$ alkyl groups such as methyl, ethyl, n-propyl, iso-propyl, n-butyl, sec butyl, t-butyl, amyl, t-amyl, n-pentyl, n-hexyl, i-octyl. In some embodiments, $R_1$ and $R_2$ are independently selected from methyl, ethyl, n-propyl and iso-propyl. In some embodiments, $R_1$ and $R_2$ are ethyl. In some embodiments, the oxaloacetate compound of formula (I) is diethyl oxaloacetate. In some embodiments, the oxaloacetate compound of formula (I) is the following compound:

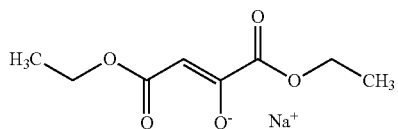

In some embodiments, the oxaloacetate compound of formula (I) is a sodium salt of diethyl oxaloacetate.

In some embodiments, $R_1$ and $R_2$ are independently selected from substituted or unsubstituted $C_2$-$C_8$ alkyenyl groups such as vinyl, allyl, 2-butenyl, 3-butenyl, 2-pentenyl, 3-pentenyl, 4-pentenyl, 2-hexenyl, 3-hexenyl, 4 hexenyl, 5-hexanyl, 2-heptenyl, 3-heptenyl, 4-heptenyl, 5-heptenyl, 6-heptenyl.

In some embodiments, the oxaloacetate compound of formula (I) is in an agriculturally acceptable salt form. Agriculturally acceptable salt forms include, but are not limited to, salts selected from alkali metals (e.g., lithium, sodium, potassium and/or cesium), and/or can be ammonia-based salts (e.g., $NH_4^+$). In some embodiments, the oxaloacetate compound of formula (I) is in a mono-salt form. A mono-salt from is a salt where the ratio of anion (i.e., oxaloacetate compound of formula (I)) to cation (e.g., alkali metal) is 1:1. In some embodiments, the alkali metal is selected from lithium, sodium, potassium, cesium and a combination. It would be understood that an agriculturally acceptable salt form of the oxaloacetate compound of formula (I) that is in the form of a mono-salt would be in tautomeric form, having structures of formulae

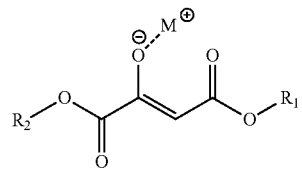

(II)

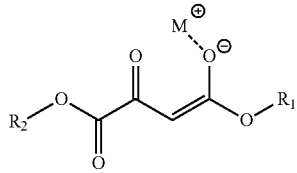

(III)

wherein M is a cation such as, but not limited to, an alkali metal cation.

In some embodiments, the tautomeric form is a single species tautomer, wherein $R_1$ and $R_2$ in the structures of formulae (II) and (III) are the same. Such a tautomeric form is referred to as a single species tautomer because the structures of formulae (II) and (III) are identical when $R_1$ and $R_2$ are the same. In some embodiments, $R_1$ and $R_2$ in structures of formulae (II) and (III) are selected from methyl, ethyl, n-propyl, and iso-propyl. In some embodiments, $R_1$ and $R_2$ in structures of formulae (II) and (III) are ethyl. In some embodiments, M is a sodium cation. In some embodiments, the oxaloacetate compound disclosed herein is a mono-salt as shown:

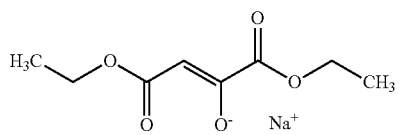

In some embodiments, the tautomeric form is a mixed species tautomer, wherein $R_1$ and $R_2$ in structures (II) and (III) are different. In some embodiments, $R_1$ and $R_2$ in structures (II) and (III) are independently selected from methyl, ethyl, n-propyl, and iso-propyl. In some embodiments, M is a sodium cation.

The amount of tautomer having the structure of formula (II) and the amount of tautomer having the structure of formula (III) present in a mixed species tautomer of the mono-salt of the oxaloacetate compound of formula (I) can vary. In some embodiments, the amount of tautomer having the structure of formula (II) is greater than the amount of tautomer having the structure of formula (III) present in the mixed species tautomer of the mono-salt of the oxaloacetate compound of formula (I). In some embodiments, the amount of tautomer having the structure of formula (II) is less than the amount of tautomer having the structure of formula (III) present in the mixed species tautomer of the mono-salt of the oxaloacetate compound of formula (I).

In some embodiments, the amount of tautomer having the structure of formula (II) and the amount of tautomer having the structure of formula (III) are present in a molar ratio of about 1:1000 to about 1000:1, about 1:500 to about 500:1, about 1:100 to about 100:1, about 1:50 to about 50:1, about 1:25 to about 25:1, about 1:10 to about 10:1, about 1:5 to about 5:1, about 1:2 to about 2:1, or about 1:1.

In some embodiments, the oxaloacetate compound of formula (I) is in an agriculturally acceptable salt form that includes a salt having a divalent cation ($M^{+2}$). Such salt forms of the oxaloacetate compound of formula (I) are referred to as being in a di-salt form. A di-salt form is a salt where the ratio of anion (i.e., oxaloacetate compound of formula (I)) to divalent cation is 2:1. In some embodiments, the divalent cation is an alkaline earth metal (e.g., magnesium, calcium, and/or a combination thereof). In some embodiments, the divalent cation $M^{+2}$ is a transition metal (e.g., manganese, iron, cobalt, nickel, copper, zinc, and/or a combination thereof).

It would be understood that an agriculturally acceptable salt form of the oxaloacetate compound of formula (I) that is in the form of a di-salt, having a structure of formula (IV):

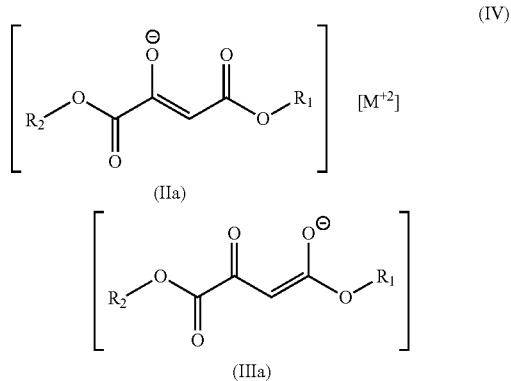

wherein subformula (IIa) and (IIIa) describe the structures of the tautomeric forms of the salt form of oxaloacetate compound of formula (I) that is associated and/or complexed with the divalent cation $M^{+2}$, which can be an alkaline metal divalent cation and/or a transition metal divalent cation as described above. However, the di-salt having the structure of formula (IV) is not limited to these particular divalent cations for $M^{+2}$.

In some embodiments, the di-salt of the oxaloacetate compound of formula (I) is a uniform di-salt, wherein $R_1$ and $R_2$ in subformulae (IIa) and (IIIa) in the structure of formula (IV) are the same. In some embodiments, $R_1$ and $R_2$ in subformulae (IIa) and (IIIa) in the structure of formula (IV) are selected from methyl, ethyl, n-propyl, and iso-propyl. In some embodiments, $R_1$ and $R_2$ in subformulae (IIa) and (IIIa) in the structure of formula (IV) are ethyl. In some embodiments, $M^{+2}$ in formula (IV) is a magnesium cation.

In some embodiments, the di-salt of the oxaloacetate compound of formula (I) is a mixed di-salt, wherein $R_1$ and $R_2$ in subformulae (IIa) and (IIIa) in the structure of formula (IV) are different. In some embodiments, $R_1$ and $R_2$ in subformulae (IIa) and (IIIa) in the structure of formula (IV) are independently selected from methyl, ethyl, n-propyl, and iso-propyl. In some embodiments, $M^{+2}$ in formula (IV) is a magnesium cation.

It will be understood by a person of skill in the art that the herbicidally effective amount of the oxaloacetate compound of formula (I) present in the herbicidal composition can vary as it is depending upon factors such as the type of unwanted vegetation being targeted by the herbicidal composition, the type of application method being used, the type of formulation being used, additional components present in the herbicidal composition (e.g., additional pesticides), environmental factors (such as atmospheric temperature and/or moisture content prior/during/and post application, soil characteristics such as pH, heavy metal content, nutrient content, microbial activity, granularity, composition (e.g., clay and/or sandy) etc.), mode of action and/or selectivity of the herbicidal composition being applied, and the like. In some embodiments, the oxaloacetate compound in the herbicidal composition is present in an herbicidally effective amount ranging from about 0.005 to about 500 kilograms/hectare (Kg/ha), from about 0.05 to about 500 kg/ha, from about 0.5 to about 500 kg/ha, from about 1 to about 500 kg/ha, from about 5 to about 400 kg/ha, from about 5 to about 300 kg/ha, from about 10 to about 300 kg/ha, from about 100 to about 250 kg/ha, or from about 150 to about 200 kg/ha.

In some embodiments, the herbicidal composition is a non-selective herbicidal composition (e.g., broad-spectrum herbicidal composition). In some embodiments, the herbicidal composition is a selective herbicidal composition. A skilled person in the art would understand that the degree of selectivity of the herbicidal composition can vary and is often quantified in terms of the extend of injury to the crops when exposed to the herbicidal composition disclosed herein. In some embodiments, the disclosed herbicidal composition is a selective herbicidal composition, wherein the amount of crops being injured when contacted with the herbicide composition is no more than 10%, 9%, 8%, 7%, 6%, 5%, 4%, 3%, 2%, 1%, or less than 0.5% based on the total number of crop plants in a given crop plant population.

In some embodiments, the herbicidal composition exhibits a mode of action (MOA) that is known. In some embodiments, the herbicidal composition has a MOA that modulates one or more known cellular processes selected from lipid synthesis, amino acid synthesis, growth regulation, photosynthesis, nitrogen metabolism, pigment inhibition, cell membrane disruption, seedling root growth, and seedling shoot growth. In some embodiments, the herbicidal composition exhibits a MOA that is not known. In some embodiments, the herbicidal composition has a MOA that modulates one or more unknown enzymes that are implicated in cellular processes of the unwanted plant/vegetation.

In some embodiments, the herbicidal composition is a contact herbicide. Such herbicides do not translocate or move through the (unwanted) plant. Only portions of the (unwanted) plant that is contacted by this type of herbicide is killed. Thus, these types of herbicides are only effective when applied to the plant directly and not to the soil.

In some embodiments, the herbicidal composition is a systemic herbicide composition. Systemic herbicides are understood to be absorbed by foliage or roots and translocated to other parts of the plant. Further, such herbicides are able to alter the normal biological function of the plant by interfering with certain biochemical reactions. They can be applied to foliage or soil and are able to translocate to their site of action once they enter the (unwanted) plant.

In some embodiments, the herbicidal composition as disclosed herein exhibits a controlling effect on the growth of one or more particular type(s) of unwanted vegetation by at least about 10%, 20%, 30%, 40%, 50%, 60%, 70%, 80%, 90%, 95% or at least about 98% based on a given population of plants of unwanted vegetation present in the target area. In some embodiments, the herbicidal composition as disclosed herein inhibits growth of one or more particular type(s) of unwanted vegetation by at least about 10%, 20%, 30%, 40%, 50%, 60%, 70%, 80%, 90%, 95% or at least about 98%, wherein growth is measured as a function of the size and/or height of the plant and/or the foliage of the plant.

In some embodiments, the herbicidal composition as disclosed herein inhibits reproduction of one or more particular type(s) of unwanted vegetation by at least about 10%, 20%, 30%, 40%, 50%, 60%, 70%, 80%, 90%, 95%, or at least about 98% based on a given population of unwanted vegetation present in the target area. In some embodiments, the herbicidal composition as disclosed herein kills one or more particular type(s) of unwanted vegetation by at least about 10%, 20%, 30%, 40%, 50%, 60%, 70%, 80%, 90%, 95%, or about 98% based on a given population of unwanted vegetation present in the target area.

In some embodiments, the herbicidal composition as disclosed herein exhibits a controlling effect on the growth of one or more particular type(s) of unwanted vegetation that is at least about 10%, 20%, 30%, 40%, 50%, 60%, or at least about 70% higher compared to Roundup® (containing glyphosate) and/or Bayer Advanced® (containing 2,4-dimethylamine salt), wherein growth is measured as a function of the size and/or height of the plant and/or the foliage of the plant. In some embodiments, the herbicidal composition as disclosed herein inhibits growth of one or more particular type(s) of unwanted vegetation by at least about 10%, 20%, 30%, 40%, 50%, 60%, or at least about 70% more compared to Roundup® (containing glyphosate) and/or Bayer Advanced® (containing 2,4-dimethylamine salt), wherein growth is measured as a function of the size and/or height of the plant and/or the foliage of the plant. In some embodiments, the herbicidal composition as disclosed herein inhibits reproduction of one or more particular type(s) of unwanted vegetation by at least about 10%, 20%, 30%, 40%, 50%, 60%, or at least about 70% more compared to Roundup® (containing glyphosate) and/or Bayer Advanced® (containing 2,4-dimethylamine salt), based on a given population of unwanted vegetation. In some embodiments, the herbicidal composition as disclosed herein inhibits reproduction of one or more particular type(s) of unwanted vegetation by at least about 10%, 20%, 30%, 40%, 50%, 60%, or at least about 70% more compared to Roundup® (containing glyphosate) and/or Bayer Advanced® (containing 2,4-dimethylamine salt), based on a given population of unwanted vegetation.

II. Herbicidal Formulation

The disclosed herbicidal composition can be used in its unmodified original form (e.g., neat) or can be formulated into an herbicide formulation comprising one or more auxiliaries selected from extenders, carriers, solvents, surfactants (surface-active agents), stabilizers, anti-foaming agents, anti-freezing agents, preservatives, antioxidants, viscosity modifiers, suspending agents, light absorbers, corrosion inhibitors, fragrances, pH-modifying substances, glidants, lubricants, plasticisers, complexing agents, colorants, thickeners, solid adherents, fillers, wetting agents, dispersing agents, lubricants, anticaking agents, deformers and diluents. Such auxiliaries are known in the art and are commercially available. Their use in the formulation of the disclosed herbicidal compositions will be apparent to a person skilled in the art.

The amount of herbicidal composition present in the herbicidal formulation as disclosed herein can vary. In some embodiments, the herbicidal composition is present in an amount ranging from about 0.1% to about 99.9%, from about 10% to about 90%, from about 20% to about 80%, from about 30% to about 70%, or from about 40% to about 60% by weight based on the total weight of the herbicidal formulation. In some embodiments, the herbicidal composition is present in an amount ranging from about 0.1% to about 75%, from about 1% to about 70% from about 10% to about 60%, from about 20% to about 50%, or from about 25% to about 40% by weight based on the total weight of the herbicidal formulation. In some embodiments, the herbicidal composition is present in an amount ranging from about 10% to about 99.9%, from about 20% to about 95%, from about 30% to about 90% from about 35% to about 80% from about 40% to about 75%, or from about 50% to about 70% by weight based on the total weight of the herbicidal formulation.

In some embodiments, the herbicidal formulation contains one or more auxilaries selected from carriers and/or solvents. Exemplary carriers and/or solvent that can be used in liquid herbicide formulations include, but are not limited to, water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1, 2-dichloropropane, diethanolamine, p-diethylbenzene, diethylene glycol, diethylene glycol abietate, diethylene glycol butyl ether, diethylene glycol ethyl ether, diethylene glycol methyl ether, A/,A/-dimethylformamide, dimethyl sulfoxide, 1, 4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1, 1, 1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, A/-methyl-2-pyrrolidone and the like.

The amount of the liquid carrier(s) and/or solvent(s) present in a liquid herbicidal formulation can vary. In some embodiments, the liquid carrier(s) and/or solvent(s) are present in an amount ranging from about 0.1% to about 99.9%, from about 10% to about 90%, from about 20% to about 80%, from about 30% to about 70%, or from about 40% to about 60% by weight based on the total weight of the liquid herbicidal formulation. In some embodiments, the carrier(s) and/or solvent(s) are present in an amount ranging from about 0.1% to about 75%, from about 1% to about 70% from about 10% to about 60%, from about 20% to about 50%, or from about 25% to about 40% by weight based on the total weight of the herbicidal formulation. In some embodiments, the carrier(s) and/or solvent(s) are present in an amount ranging from about 10% to about 99.9%, from about 20% to about 95%, from about 30% to about 90% from about 35% to about 80% from about 40% to about 75%, or from about 50% to about 70% by weight based on the total weight of the herbicidal formulation.

In some embodiments, the herbicidal formulation contains one or more auxilaries selected from carriers that are used in solid herbicidal formulations. Exemplary solid carriers include, but are not limited to, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

The amount of the solid carrier(s) present in a solid herbicidal formulation can vary. In some embodiments, the solid carrier(s) are present in an amount ranging from about 0.1% to about 99.9%, from about 10% to about 90%, from about 20% to about 80%, from about 30% to about 70%, or from about 40% to about 60% by weight based on the total weight of the solid herbicidal formulation. In some embodiments, the solid carrier(s) are present in an amount ranging from about 0.1% to about 75%, from about 1% to about 70% from about 10% to about 60%, from about 20% to about 50%, or from about 25% to about 40% by weight based on the total weight of the herbicidal formulation. In some embodiments, the solid carrier(s) are present in an amount ranging from about 10% to about 99.9%, from about 20% to about 95%, from about 30% to about 90% from about 35% to about 80% from about 40% to about 75%, or from about 50% to about 70% by weight based on the total weight of the herbicidal formulation.

In some embodiments, the herbicidal formulation contains surfactants (surface-active agents). Surfactants are designed to improve the dispersing/emulsifying, absorbing, spreading, sticking and/or pestpenetrating properties of a liquid herbicidal formulation such as, e.g., a spray mixture. Pure water will stand as a droplet, with a small area of contact with the waxy leaf surface of an unwanted plant/vegetation. Water droplets containing a surfactant will spread in a thin layer over a waxy leaf surface. Because the effectiveness of postemergence herbicidal compositions is greatly influenced by plant factors of the unwanted plant/vegetation such as age, size and the growing conditions encountered before application, herbicide performance can vary. A way to minimize the variations in postemergence herbicide performance, for example, is to use an auxillary, such as a surfactant in the spray solution containing the herbicidal composition. Thus, surfactants can greatly improve the effectiveness of postemergence herbicidal compositions.

Based on chemical composition, surfactants can be divided into the following five groupings: 1. nonionic surfactants (NIS); 2. crop oil concentrates (COC); 3. nitrogen-surfactant blends; 4. esterified seed oils; and 5. organo-silicones. NIS are comprised of linear or nonyl-phenol alcohols and/or fatty acids. This class of surfactant reduces surface tension and improves spreading, sticking and herbicide uptake. Crop oil concentrates are composed of a blend of paraffinic-based petroleum oil and surfactants. This surfactant class reduces surface tension and improves herbicide uptake and leaf surface spreading. Nitrogen-surfactant blends consist of premix combinations of various forms of nitrogen and surfactants. They generally are used with herbicides recommending the addition of ammonium sulfate or 28% nitrogen. These surfactants reduce surface tension and improve leaf surface spreading. Esterified seed oils are produced by reacting fatty acids from seed oils (corn, soybean, sunflower, and canola) with an alcohol to form esters. The methyl or ethyl esters produced by this reaction are combined with surfactants/emulsifiers to form an esterified seed oil. These surfactants reduce surface tension and improve herbicide uptake by improving herbicide distribution on the leaf surface. Organo-silicones are usually silicone/surfactant blends of silicone to nonionic or other surfactants; a few within this classification are composed entirely of silicone. These surfactants provide a tremendous reduction in surface tension and spread more than conventional surfactants. In addition, this class of surfactant provides improved effectiveness through maximum rainfastness.

The addition of oils as surfactants in spray solutions is a relatively common practice, depending on the type of herbicide and the weeds involved. As such, it is important to note that not all oils provide the same surfactant effectiveness. In general, three types of oils are commonly referred to as surfactants: vegetable seed oils, crop oil concentrates, and esterified seed oils. Vegetable seed oils are a blend of vegetable oil (cottonseed and soybean) and surfactants. These surfactants exhibit good crop tolerance but do not have good spreading, sticking or pest-penetrating properties. Crop oil concentrates are a blend of paraffinic oil (petroleum based) and surfactants. These surfactants exhibit good spreading and penetrating properties but crop tolerance may be a problem. Esterified seed oils are comprised of a methyl or ethyl ester of a vegetable seed oil (sunflower, soybean, corn, and canola) combined with a surfactant/emulsifier. These spray solution additives have good spreading and pest-penetrating properties and convey good crop tolerance. However, these additives generally are more expensive than vegetable seed oils or crop oil concentrates.

Thus, in some embodiments, the herbicidal formulation contains one or more surfactants selected from nonionic surfactants, crop oil concentrates, nitrogen-surfactant blends, esterified seed oils, organo-silicones, vegetable seed oils, esterfied seed oils and a combination thereof. A skilled artisan would be aware of what surfactants to choose to optimize the action and/or efficacy of the herbicidal composition, the formulation used, the application type (e.g., preplant, preemergent, and/or postemergent), application equipment used, environmental and/or human safety, environmental conditions (e.g., climate and/or soil properties) before, during and/or after application, and/or plant features of the unwanted vegetation (e.g., leaf-surface characteristics) and/or crops.

Further, a skilled person in the art would also be aware of the type and combination of auxilaries that would be required to optimize the herbicidal formulation based on the just listed properties and additional properties apparent to a skilled person in the art.

The herbicidal formulation can be in the form of a liquid or a solid. Examples of liquid and solid herbicidal formulations include, but are not limited to, soluble liquids (SF), emulsifiable concentrates (EC), wettable powders (WP), dry flowable (DF), flowables (F), water soluble powders (SP), ultra-low-volume concentrate (ULV), suspension concentrates (SC), aqueous suspensions (AS), microencapsulated suspension (ME or MT), capsule suspension (CS), granules (G), or pellets (P). In some embodiments, the herbicidal composition is in the form of a soluble salt, which is water soluble and requires little to no agitation to stay in solution. These types of formulations are often referred to as solutions (S), soluble concentrates (SC), liquid (L), and water soluble concentrates (WSC). In some embodiments, these types of formulations (e.g., S) are "ready-to-use." In some embodiments, the formulation is a tank mix formulation or a premix formulation. In some embodiments, these types of formulations (e.g., SC, WSC) are diluted with water prior to use. In some embodiments, the herbicidal composition disclosed herein is in the form of a granule (G).

III. Other Composition(s)

Any of the described herbicidal compositions can be further combined with one or more other ingredients, selected from the group consisting of fertilizer, agriculturally active compounds, pesticides, herbicide, and the like.

In some embodiments, the herbicidal composition further comprises a pesticide component. In some embodiments, the herbicidal composition may be mixed with the pesticide component, applied as a surface coating to the pesticide component, impregnated onto the pesticide component, or otherwise thoroughly mixed with the pesticide component. A skilled person in the art would be aware of what type of pesticide would be compatible with the oxaloacetate compound described herein. The oxaloacetate compound and pesticide component can be present in the herbicidal composition in varying amounts. In some embodiments, the oxaloacetate compound is present in an amount of from about 0.01% to about 99%, from about 10% to about 80%, from about 20% to about 70%, or from about 30% to about 60% by weight based on the total weight of the herbicidal composition. In some embodiments, the pesticide component is present in an amount of from about 0.01% to about 99%, from about 10% to about 80%, from about 20% to about 70%, or from about 30% to about 60% by weight based on the total weight of the herbicidal composition.

In some embodiments, the oxaloacetate compound and the pesticide component are present in a ratio of from about 1:100 to about 100:1, from about 1:50 to about 50:1, from about 1:25 to about 25:1, from about 1:20 to about 20:1, from about 1:10 to about 10:1, from about 1:5 to about 5:1, from about 1:2 to about 2:1, or about 1:1 oxaloacetate compound to pesticide component based on weight.

In some embodiments, the pesticide component is selected from insecticides, bactericides, fungicides, larvicides, acaricides, nematocide, molluscicide, miticides, plant growth regulator, and a combination thereof. In some embodiments, the pesticide component is an insecticide. Exemplary insecticides include, but are not limited to, 1,2-dichloropropane, 1,3-dichloropropene, abamectin, acephate, acequinocyl, acetamiprid, acethion, acetoprole, acrinathrin, acrylonitrile, alanycarb, aldicarb, aldoxycarb, aldrin, allethrin, allosamidin, allyxycarb, alpha cypermethrin, alpha ecdysone, amidithion, amidoflumet, aminocarb, amiton, amitraz, anabasine, arsenous oxide, athidathion, azadirachtin, azamethiphos, azinphos-ethyl, azinphos-methyl, azobenzene, azocyclotin, azothoate, barium hexafluorosilicate, barthrin, benclothiaz, bendiocarb, benfuracarb, benoxafos, bensultap, benzoximate, benzyl benzoate, beta cyfluthrin, beta cypermethrin, bifenazate, bifenthrin, binapacryl, bioallethrin, bioethanomethrin, biopermethrin, bistrifluron, borax, boric acid, bromfenvinfos, bromo DDT, bromocyclen, bromophos, bromophos-ethyl, bromopropylate, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, chinomethionat, chlorantraniliprole, chlorbenside, chlorbicyclen, chlordane, chlordecone, chlordimeform, chlorethoxyfos, chlorfenapyr, chlorfenethol, chlorfenson, chlorfensulphide, chlorfenvinphos, chlorfluazuron, chlormephos, chlorobenzilate, chloroform, chloromebuform, chloromethiuron, chloropicrin, chloropropylate, chlorphoxim, chlorprazophos, chlorpyrifos, chlorpyrifos-methyl, chlorthiophos, chromafenozide, cinerin I, cinerin II, cismethrin, cloethocarb, clofentezine, closantel, clothianidin, copper acetoarsenite, copper arsenate, copper naphthenate, copper oleate, coumaphos, coumithoate, crotamiton, crotoxyphos, cruentaren A & B, crufomate, cryolite, cyanofenphos, cyanophos, cyanthoate, cyclethrin, cycloprothrin, cyenopyrafen, cyflumetofen, cyfluthrin, cyhalothrin, cyhexatin, cypermethrin, cyphenothrin, cyromazine, cythioate, d-limonene, dazomet, DBCP, DCIP, DDT, decarbofuran, deltamethrin, demephion, demephion O, demephion S, demeton, demeton methyl, demeton O, demeton O methyl, demeton S, demeton S methyl, demeton S methylsulphon, diafenthiuron, dialifos, diamidafos, diazinon, dicapthon, dichlofenthion, dichlofluanid, dichlorvos, dicofol, dicresyl, dicrotophos, dicyclanil, dieldrin, dienochlor, diflovidazin, diflubenzuron, dilor, dimefluthrin, dimefox, dimetan, dimethoate, dimethrin, dimethylvinphos, dimetilan, dinex, dinobuton, dinocap, dinocap 4, dinocap 6, dinocton, dinopenton, dinoprop, dinosam, dinosulfon, dinotefuran, dinoterbon, diofenolan, dioxabenzofos, dioxacarb, dioxathion, diphenyl sulfone, disulfiram, disulfoton, dithicrofos, DNOC, dofenapyn, doramectin, ecdysterone, emamectin, EMPC, empenthrin, endosulfan, endothion, endrin, EPN, epofenonane, eprinomectin, esfenvalerate, etaphos, ethiofencarb, ethion, ethiprole, ethoate-methyl, ethoprophos, ethyl DDD, ethyl formate, ethylene dibromide, ethylene dichloride, ethylene oxide, etofenprox, etoxazole, etrimfos, EXD, famphur, fenamiphos, fenazaflor, fenazaquin, fenbutatin oxide, fenchlorphos, fenethacarb, fenfluthrin, fenitrothion, fenobucarb, fenothiocarb, fenoxacrim, fenoxycarb, fenpirithrin, fenpropathrin, fenpyroximate, fenson, fensulfothion, fenthion, fenthion-ethyl, fentrifanil, fenvalerate, fipronil, flonicamid, fluacrypyrim, fluazuron, flubendiamide, flubenzimine, flucofuron, flucycloxuron, flucythrinate, fluenetil, flufenerim, flufenoxuron, flufenprox, flumethrin, fluorbenside, fluvalinate, fonofos, formetanate, formothion, formparanate, fosmethilan, fospirate, fosthiazate, fosthietan, fosthietan, furathiocarb, furethrin, furfural, gamma cyhalothrin, gamma HCH, halfenprox, halofenozide, HCH, HEOD, heptachlor, heptenophos, heterophos, hexaflumuron, hexythiazox, HHDN, hydramethylnon, hydrogen cyanide, hydroprene, hyquincarb, imicyafos, imidacloprid, imiprothrin, indoxacarb, iodomethane, IPSP, isamidofos, isazofos, isobenzan, isocarbophos, isodrin, isofenphos, isoprocarb, isoprothiolane, isothioate, isoxathion, ivermectin jasmolin I, jasmolin II, jodfenphos, juvenile hormone I, juvenile hormone II, juvenile hormone III, kelevan, kinoprene, lambda cyhalothrin, lead arsenate, lepimectin, leptophos, lindane, lirimfos, lufenuron, lythidathion, malathion, malonoben, mazidox, mecarbam, mecarphon, menazon, mephosfolan, mercurous chloride, mesulfen, mesulfenfos, metaflumizone, metam, methacrifos, methamidophos, methidathion, methiocarb, methocrotophos, methomyl, methoprene, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, MNAF, monocrotophos, morphothion, moxidectin, naftalofos, naled, naphthalene, nicotine, nifluridide, nikkomycins, nitenpyram, nithiazine, nitrilacarb, novaluron, noviflumuron, omethoate, oxamyl, oxydemeton-methyl, oxydeprofos, oxydisulfoton, paradichlorobenzene, parathion, parathion-methyl, penfluron, pentachlorophenol, permethrin, phenkapton, phenothrin, phenthoate, phorate, phosalone, phosfolan, phosmet, phosnichlor, phosphamidon, phosphine, phosphocarb, phoxim, phoxim-methyl, pirimetaphos, pirimicarb, pirimiphos-ethyl, pirimiphos-methyl, potassium arsenite, potassium thiocyanate, pp' DDT, prallethrin, precocene I, precocene II, precocene III, primidophos, proclonol, profenofos, profluthrin, promacyl, promecarb, propaphos, propargite, propetamphos, propoxur, prothidathion, prothiofos, prothoate, protrifenbute, pyraclofos, pyrafluprole, pyrazophos, pyresmethrin, pyrethrin I, pyrethrin II, pyridaben, pyridalyl, pyridaphenthion, pyrifluquinazon, pyrimidifen, pyrimitate, pyriprole, pyriproxyfen, quassia, quinalphos, quinalphos, quinalphos-methyl, quinothion, quantifies, rafoxanide, resmethrin, rotenone, ryania, sabadilla, schradan, selamectin, silafluofen, sodium arsenite, sodium fluoride, sodium hexafluorosilicate, sodium thiocyanate, sophamide, spinetoram, spinosad, spirodiclofen, spiromesifen, spirotetramat, sulcofuron, sulfiram, sulfluramid, sulfotep, sulfur, sulfuryl fluoride, sulprofos, tau fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetradifon, tetramethrin, tetranactin, tetrasul, theta cypermethrin, thiacloprid, thiamethoxam, thicrofos, thiocarboxime, thiocyclam, thiodicarb, thiofanox, thiometon, thionazin, thioquinox, thiosultap, thuringiensin, tolfenpyrad, tralomethrin, transfluthrin, transpermethrin, triarathene, triazamate, triazophos, trichlorfon, trichlormetaphos 3, trichloronat, trifenofos, triflumuron, trimethacarb, triprene, vamidothion, vamidothion, vaniliprole, vaniliprole, XMC, xylylcarb, zeta cypermethrin and zolaprofos.

In some embodiments, the pesticide component is a fungicide. Exemplary fungicides include, but are not limited to, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulfide, benalaxyl, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, bixafen, blasticidin-S, Bordeaux mixture, boric acid, boscalid, bridged diphenyl fungicides, bromuconazole, bupirimate, Burgundy mixture, buthiobate, sec-butylamine, calcium polysulfide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroform, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper(II) carbonate, basic, copper fungicides, copper hydroxide, copper naphthenate, copper oleate, copper oxychloride, copper(II) sulfate, copper sulfate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, diniconazole-M, dinitrophenol fungicides, dinobuton, dinocap, dinocap-4, dinocap-6, dinocton, dinopenton, dinosulfon, dinoterbon, diphenylamine, dipyrithione, disulfiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylene oxide, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulf, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fluconazole, fludioxonil, flumetover, flumorph, fluopicolide, fluoroimide, fluotrimazole, fluoxastrobin, fluquinconazole, flusilazole, flusulfamide, flutolanil, flutriafol, fluxapyroxad, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isopropyl alcohol, isoprothiolane, isovaledione, isopyrazam, kasugamycin, ketoconazole, kresoxim-methyl, Lime sulfur (lime sulphur), mancopper, mancozeb, maneb, mebenil, mecarbinzid, mepanipyrim, mepronil, mercuric chloride (obsolete), mercuric oxide (obsolete), mercurous chloride (obsolete), metalaxyl, metalaxyl-M (a.k.a. Mefenoxam), metam, metazoxolon, metconazole, methasulfocarb, methfuroxam, methyl bromide, methyl isothiocyanate, methylmercury benzoate, methylmercury dicyandiamide, methylmercury pentachlorophenoxide, metiram, metominostrobin, metrafenone, metsulfovax, milneb, morpholine fungicides, myclobutanil, myclozolin, N-(ethylmercury)-p-toluenesulfonanilide, nabam, natamycin, nystatin, β-nitrostyrene, nitrothal-isopropyl, nuarimol, OCH, octhilinone, ofurace, oprodione, organomercury fungicides, organophosphorus fungicides, organotin fungicides (obsolete), orthophenyl phenol, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulfamide fungicides, phosdiphen, phosphite, phthalide, phthalimide fungicides, picoxystrobin, piperalin, polycarbamate, polymeric dithiocarbamate fungicides, polyoxins, polyoxorim, polysulfide fungicides, potassium azide, potassium polysulfide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfur, pyrrole fungicides, quinacetol, quinazamid, quinconazole, quinoline fungicides, quinomethionate, quinone fungicides, quinoxaline fungicides, quinoxyfen, quintozene, rabenzazole, salicylanilide, silthiofam, silver, simeconazole, sodium azide, sodium bicarbonate[2][3], sodium orthophenylphenoxide, sodium pentachlorophenoxide, sodium polysulfide, spiroxamine, streptomycin, strobilurin fungicides, sulfonanilide fungicides, sulfur, sulfuryl fluoride, sultropen, TCMTB, tebuconazole, tecloftalam, tecnazene, tecoram, tetraconazole, thiabendazole, thiadifluor, thiazole fungicides, thicyofen, thifluzamide, thymol, triforine, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, tridemorph, trifloxystrobin, triflumizole, triforine, triticonazole, unclassified fungicides, undecylenic acid, uniconazole, uniconazole-P, urea fungicides, validamycin, valinamide fungicides, vinclozolin, voriconazole, zarilamid, zinc naphthenate, zineb, ziram, and/or zoxamide.

In some embodiments, the herbicidal composition further comprises an herbicide component. In some embodiments, the herbicidal composition may be mixed with the herbicide component, applied as a surface coating to the herbicide component, impregnated onto the herbicide component, or otherwise thoroughly mixed with the herbicide component. A skilled person in the art would be aware of what type of herbicide would be compatible with the oxaloacetate compound described herein. The oxaloacetate compound and herbicide component can be present in the herbicidal composition in varying amounts. In some embodiments, the oxaloacetate compound is present in an amount of from about 0.01% to about 99%, from about 10% to about 80%, from about 20% to about 70%, or from about 30% to about 60% by weight based on the total weight of the herbicidal composition. In some embodiments, the herbicide component is present in an amount of from about 0.01% to about 99%, from about 10% to about 80%, from about 20% to about 70%, or from about 30% to about 60% by weight based on the total weight of the herbicidal composition.

In some embodiments, the oxaloacetate compound and the herbicide component are present in a ratio of from about 1:100 to about 100:1, from about 1:50 to about 50:1, from about 1:25 to about 25:1, from about 1:20 to about 20:1, from about 1:10 to about 10:1, from about 1:5 to about 5:1, from about 1:2 to about 2:1, or about 1:1 oxaloacetate compound to herbicide component based on weight.

In some embodiments, the herbicide component is a non-selective herbicide. In some embodiments, the herbicide component is a selective herbicide. Exemplary herbicides include, but are not limited to, acetochlor, alachlor, aminopyralid, atrazine, benoxacor, bromoxynil, carfentrazone, chlorsulfuron, clodinafop, clopyralid, dicamba, diclofop-methyl, dimethenamid, fenoxaprop, flucarbazone, flufenacet, flumetsulam, flumiclorac, fluroxypyr, glufosinate-ammonium, glyphosate, halosulfuron-methyl, imazamethabenz, imazamox, imazapyr, imazaquin, imazethapyr, isoxaflutole, quinclorac, MCPA, MCP amine, MCP ester, mefenoxam, mesotrione, metolachlor, s-metolachlor, metribuzin, metsulfuron-methyl, nicosulfuron, paraquat, pendimethalin, picloram, primisulfuron, propoxycarbazone, prosulfuron, pyraflufen ethyl, rimsulfuron, simazine, sulfosulfuron, thifensulfuron, topramezone, tralkoxydim, triallate, triasulfuron, tribenuron, triclopyr, trifluralin, 2,4-D, 2,4-D amine, 2,4-D ester and the like.

For an unlimited list of pesticides and herbicides, see "Farm Chemicals Handbook 2000, 2004" (Meister Publishing Co, Willoughby, OH), which is hereby incorporated by reference in its entirety.

In some embodiments, the herbicidal composition contains any suitable liquid or dry pesticide and/or herbicidal component for application to fields and/or crops.

The described oxaloacetate compound present in the herbicidal composition can be applied with the application of a pesticide and/or herbicide component of the herbicidal composition. The oxaloacetate compound present in the herbicidal composition can be applied prior to, subsequent to, or simultaneously with the application of the pesticide and/or herbicide component present in the herbicidal composition.

In some embodiments, the herbicidal composition is further combined with a fertilizer. In some embodiments, the herbicidal composition may be mixed with, tank mixed in, impregnated in, absorbed onto, coated onto, applied as a surface coating to the fertilizer, or otherwise thoroughly mixed with the fertilizer. The oxaloacetate compound and fertilizer can be present in the herbicidal composition in varying amounts. In some embodiments, the oxaloacetate compound is present in an amount of from about 0.01% to about 99%, from about 10% to about 80%, from about 20% to about 70%, or from about 30% to about 60% by weight based on the total weight of the herbicidal composition. In some embodiments, the fertilizer is present in an amount of from about 0.01% to about 99%, from about 10% to about 80%, from about 20% to about 70%, or from about 30% to about 60% by weight based on the total weight of the herbicidal composition.

In some embodiments, the oxaloacetate compound and the fertilizer are present in a ratio of from about 1:100 to about 100:1, from about 1:50 to about 50:1, from about 1:25 to about 25:1, from about 1:20 to about 20:1, from about 1:10 to about 10:1, from about 1:5 to about 5:1, from about 1:2 to about 2:1, or about 1:1 oxaloacetate compound to fertilizer based on weight.

The fertilizer can be a solid fertilizer, such as, but not limited to, a granular fertilizer, and the herbicidal composition can be applied to the fertilizer as a liquid dispersion. The fertilizer can be in liquid form, and the herbicidal composition can be mixed with the liquid fertilizer. The fertilizers can be selected from the group consisting of starter fertilizers, phosphate-based fertilizers, fertilizers containing nitrogen, fertilizers containing phosphorus, fertilizers containing potassium, fertilizers containing calcium, fertilizers containing magnesium, fertilizers containing boron, fertilizers containing chlorine, fertilizers containing zinc, fertilizers containing manganese, fertilizers containing copper, fertilizers containing urea and ammonium nitrite and/or fertilizers containing molybdenum materials. In some embodiments, the fertilizer is or contains urea, and/or ammonia, including anhydrous ammonia fertilizer. In some embodiments, the fertilizer comprises plant-available nitrogen, phosphorous, potassium, sulfur, calcium, magnesium. or micronutrients. In some embodiments, the fertilizer is solid, granular, a fluid suspension, a gas, or a solutionized fertilizer. In some embodiments, the fertilizer comprises a micronutrient. A micronutrient is an essential element required by a plant in small quantities. In some embodiments, the fertilizer comprises a metal ion selected from the group consisting of. Fe, Mn, Mg, Zn, Cu, Ni, Co, Mo, V, and Ca. In some embodiments, the fertilizer comprises gypsum, Kieserite Group member, potassium product, potassium magnesium sulfate, elemental sulfur, or potassium magnesium sulfate. Such fertilizers may be granular, liquid, gaseous, or mixtures (e.g., suspensions of solid fertilizer particles in liquid material).

In some embodiments, the oxaloacetate compounds present in the herbicidal composition are combined with any suitable liquid or dry fertilizer for application to fields and/or crops.

The described oxaloacetate compounds present in the disclosed herbicidal composition can be applied with the application of a fertilizer component. The oxaloacetate compounds present in the herbicidal composition can be applied prior to, subsequent to, or simultaneously with the application of the fertilizer component present in the herbicidal composition.

IV. Methods

In some embodiments, the herbicidal compositions can be used directly. In other embodiments, the herbicidal compositions are formulated in ways to make their use convenient in the context of productive agriculture.

In particular, the herbicidal compositions and/or herbicidal formulations as disclosed herein can be used in methods of controlling undesired vegetation in a target area, wherein the method comprises applying to the target area an herbicidally effective amount of the herbicidal composition or formulation thereof. In some embodiments, the target area is an agricultural field, a lawn, a garden, a vineyard, an orchard, a plantation, or a combination thereof.

In some embodiments, the herbicidal composition and/or formulation thereof is applied to the soil of the target area. In some embodiments, the herbicidal composition and/or formulation thereof is applied to the soil prior to the planting of the crops of cultivated plants. Further, the top layer of the soil (e.g., top 1-5 inches of soil) is mechanically incorporated with the just applied herbicidal composition or formulation thereof using known agricultural mixing methods in the art (e.g., tilling, rotating). Such an herbicidal composition is referred to as a preplant incorporated herbicidal composition, with respect to the crops of cultivated plants.

In some embodiments, the herbicidal composition and/or formulation thereof is applied to the soil of the target area prior to planting the crops of cultivated plants without mechanically incorporating the herbicidal composition into the top layer of the soil. Such an herbicidal composition is referred to as a preplant herbicidal composition, with respect to the crops of the cultivated plants.

In some embodiments, the herbicidal composition and/or formulation thereof is applied to the soil and/or the unwanted vegetation (if it has emerged) after the crop has been planted but before it emerges. Such an herbicidal composition is referred to as a preemergent herbicidal composition, with respect to the crops of cultivated plants.

Thus, in some embodiments, the herbicidal composition is applied to the soil of the target area either containing no crops of cultivated plants or containing crops of cultivated plants that have not yet emerged.

In some embodiments, the herbicidal composition is applied to the soil days, weeks, or even months before planting the crop of cultivated plants. In some embodiments, the herbicidal composition is applied at least 1-6 months (or at least 1, 2, 3, 4, 5 or 6 months) prior to planting of the crops of cultivated plants. In some embodiments, the herbicidal composition is applied at least 1-3 weeks (or at least 1, 2 or 3 weeks) prior to planting of the crops of cultivated plants. In some embodiments, the herbicidal composition is applied at least 1-31 days prior to planting of the crops of cultivated plants.

A skilled person in the art would be aware that preplant incorporated, preplant and preemergent herbicidal compositions are not required to be selective herbicidal compositions. As such, application methods can be employed that non-selectively cover the entire target area (e.g., a field). Thus, in some embodiments, the herbicidal composition is applied using broadcast application methods.

In some embodiments, the herbicidal composition is directly applied to the plants of the unwanted vegetation present in the target area where the crops of cultivated plants have already emerged (e.g., using directed application and/or spot application methods). Such an herbicidal composition is referred to as a postemergent herbicidal composition, with respect to the crops of the cultivated plants. If the postemergent herbicidal composition is a non-selective herbicidal composition, care must be taken that the herbicidal composition does not come into contact with the crops of cultivated plants. Application methods of the postemergent herbicidal composition comprises that the herbicidal composition is selectively applied to the plants of the unwanted vegetation and to leave the crops of cultivated plants essentially uninjured. It would be understood that the term "essentially uninjured" refers to an amount of injured cultivated plants of crop that is no more than 10%, 9%, 8%, 7%, 6%, 5%, 4%, 3%, 2%, or about 1% based on the total number of cultivated plants present in the target area after application of the postemergent herbicidal composition. If the herbicidal composition is a selective herbicidal composition and does not cause significant injury to the crops of cultivated plants, then non-selective application methods can be employed (e.g., broadcast application methods).

The number of applications of a postemergent herbicidal composition can vary depending on the type of unwanted vegetation, the type of crop, climate, and the like. A skilled person in the art would be aware of such factors and apply the postemergent herbicidal composition accordingly. For example, in some embodiments, the postemergent herbicidal composition or formulation thereof is applied at least 1-10 times (or at least 1, 2, 3, 4, 5, 6, 7, 8, 9 or 10 times) over a time frame of 1-6 months. In some embodiments, the postemergent herbicidal composition or formulation thereof is applied weekly or monthly over a time frame of 1-12 months.

The rate of application of herbicidal composition or formulation thereof to treat a target area can vary within wide limits and depend on the nature of the soil, the method of application (pre- or post-emergence; etc.), the crop plant, the type(s) of unwanted vegetation to be controlled, the prevailing climatic conditions, and other factors governed by the method of application, the time of application and the target crop. In some embodiments, the herbicidal composition and/or formulation thereof can be applied at a rate of between about 0.1 to about 100 gallons/acre, about 1 to about 90 gallons/acre, about 10 to about 80 gallons/acre, 20 to about 70 gallons/acre, or from about 30 to about 60 gallons/acre.

In some embodiments, the herbicidal composition and/or formulation thereof can be applied at a rate of between about 1 to about 2,000 lbs./acre, about 20 to about 1,900 lbs./acre, about 50 to about 1,800 lbs./acre, about 100 to about 1,700 lbs./acre, about 125 to about 1,650 lbs./acre, about 137.5 to about 1,650 lbs./acre, about 200 to about 1,500 lbs./acre, or about 500 to about 1,000 lbs./acre. In some embodiments, the herbicidal composition and/or formulation thereof can be applied at a rate of between about 1,000 to about 2,000 lbs./acre, about 1,200 to about 1,900 lbs./acre, about 1,500 to about 1,800 lbs./acre, or from about 1,600 to about 1,700 lbs./acre. In some embodiments, the herbicidal composition and/or formulation thereof can be applied at a rate of between about 1 to about 1,000 lbs./acre, about 20 to about 900 lbs./acre, about 50 to about 800 lbs./acre, about 100 to about 700 lbs./acre, about 125 to about 650 lbs./acre, about 125 to about 500 lbs./acre, about 125 to about 400 lbs./acre, about 125 to about 300 lbs./acre, about 125 to about 200 lbs./acre, about 125 to about 150 lbs./acre, or about 130 to about 140 lbs./acre.

In some embodiments, the rate of application of the herbicidal composition depends on the plant population density present in the target area. In some embodiments, the plant population density (which includes plants of the unwanted vegetation alone or in combination with emerged crop plants) ranges from about 1 to about 200,000 plants per acre (plants/acre), from about 100 to about 200,000 plants/acre, from about 1,000 to about 200,000 plants/acre, from about 10,000 to about 175,000 plants/acre, from about 25,0000 to about 150,000 plants/acre, or from about 75,000 to about 125,000 plants/acre.

Thus, in some embodiments, the herbicidal composition is applied to the target area at a rate from about 100 to about 2,000 lbs./acre based on plant densities ranging from about 25,000 to about 150,000 plants/acre, or from about 137.5 to about 1,650 lbs./acre based on plant densities ranging from about 25,000 to about 150,000 plants/acre.

In such embodiments, the herbicidal composition is applied to each plant of the plant population present in the target area at an effective herbicidal rate, which can vary. In some embodiments, the herbicidal composition is applied at an effective herbicidal rate of from about 10 nM to about 1,000 nM, from about 100 nM to about 750 nM, or from about 250 nM to about 525 nM per plant of the unwanted vegetation. In some embodiments, the herbicidal composition is applied at an effective herbicidal rate of from about 100 nM to about 1,000 nM, from about 200 nM to about 850 nM, from about 300 nM to about 800 nM, from about 400 nM to about 700 nm, from about 500 nM to about 600, or from about 500 nM to about 550 nM per plant of the unwanted vegetation.

The amount of the herbicidal compositions and/or formulation thereof being applied to a target area may vary within wide limits and depend on the nature of the soil, the method of application (pre- or post-emergence; etc.), the crop plant, the weed(s) to be controlled, the prevailing climatic conditions, and other factors governed by the method of application, the time of application and the target crop. In some embodiments, the herbicidal composition is used in an amount of from about 1 to about 1,000 liters/hectare (L/ha), from about 100 to about 900 L/ha, from about 200 to about 800 L/ha, from about 250 to about 600 L/ha or from about 350 to about 500 L/ha. In some embodiments, the herbicidal composition is used in an amount of from about 1 to about 500 liters/hectare (L/ha), from about 100 to about 500 L/ha, from about 150 to about 450 L/ha, from about 200 to about 400 L/ha, or is from about 250 to about 350 L/ha. In some embodiments, the herbicidal composition is used in an amount of from about 100 to about 1,000 liters/hectare (L/ha), from about 200 to about 900 L/ha, from about 300 to about 800 L/ha, from about 400 to about 700 L/ha, or is from about 500 to about 650 L/ha.

In some embodiments, the herbicidal composition and/or formulation thereof is used in an amount of from about 1 to about 500 kg/hectare (kg/ha), from about 10 to about 400 kg/ha, from about 20 to about 350 kg/ha, from about 25 to about 300 kg/ha, from about 50 to about 275 kg/ha, from about 75 to about 250 kg/ha, or from about 100 to about 200 kg/ha. In some embodiments, the herbicidal composition and/or formulation thereof is used in an amount of from about 100 to about 500 kg/hectare (kg/ha), from about 150 to about 450 kg/ha, from about 200 to about 400 kg/ha, from about 250 to about 350 kg/ha, from about 200 to about 300 kg/ha, or from about 225 to about 275 kg/ha. In some embodiments, the herbicidal composition and/or formulation thereof is used in an amount of from about 1 to about 300 kg/hectare (kg/ha), from about 10 to about 250 kg/ha, from about 25 to about 200 kg/ha, from about 50 to about 150 kg/ha, from about 75 to about 125 kg/ha, or from about 75 to about 100 kg/ha.

In some embodiments, the amount the herbicidal composition being applied in a target area depends on the plant population density present in the target area. In some embodiments, the plant population density (which includes plants of the unwanted vegetation alone or in combination with emerged crop plants) ranges from about 1 to about 100,000 plants per acre (plants/acre), from about 100 to about 100,000 plants/acre, from about 1,000 to about 100,000 plants/acre, from about 10,000 to about 75,000 plants/acre, from about 10,0000 to about 60,000 plants/acre, or from about 25,000 to about 50,000 plants/acre.

Thus, in some embodiments, the herbicidal composition is used in the target area in an amount ranging from about 10 to about 400 kg/ha, based on planting densities ranging from about 10,000 to 60,000 plants/ha, or from about 25 to about 300 kg/ha, based on planting densities ranging from about 10,000 to 60,000 plants/ha.

In such embodiments, the herbicidal composition is applied to each plant of the plant population present in the target area at an effective herbicidal rate, which can vary. In some embodiments, the herbicidal composition is applied at an effective herbicidal amount of from about 1 to about 10 grams, from about 2 to about 7.5 grams, or from about 2.5 to about 5.25 grams per plant of the unwanted vegetation. In some embodiments, the herbicidal composition is applied at an effective herbicidal amount of from about 2 to about 8 grams, from about 2.5 to about 7 grams, from about 3 to about 6.5 grams, from about 3.5 to about 6 grams, from about 4 to about 5.5 grams, or from about 4.5 to about 5.5 grams per plant of the unwanted vegetation.

The herbicidal composition can be applied to the target area using application methods that are commonly used in agriculture. Exemplary application methods include, but are not limited to, band application, broadcast application, directed application and spot application.

In some embodiments, the herbicidal composition and/or formulation thereof is applied to the target area using broadcast application methods, which apply the herbicidal composition and/or formulation thereof non-selectively to the soil over the entire target area. Broadcast application methods can be used for preplant incorporated herbicidal compositions, preplant herbicidal compositions, and/or preemergent herbicidal compositions (with respect to the culticated crops) of non-selective or selective herbicidal compositions and/or formulations thereof. Thus, in some embodiments, the herbicidal composition and/or formulation thereof are applied to the soil of a target area using broadcast application methods for preplant herbicidal compositions and/or preemergent herbicidal compositions prior to emergence of unwanted vegetation.

In some embodiments, broadcast application methods are used for postemergence selective herbicidal compositions (with respect to the cultivated crops) and/or formulation thereof. In such broadcast application methods the selective postemergence herbicidal compositions and/or formulation thereof are non-selectively applied to plants and/or plant parts of the cultivated crops and unwanted vegetation.

In some embodiments, the herbicidal composition and/or formulation thereof are applied to the target area using band application methods, which apply the herbicidal composition and/or formulations thereof in the form of narrow strips over the row of cultivated crops. Band application methods use smaller amounts of herbicidal composition and/or formulation thereof compared to broadcast application methods because the target area is much smaller. Band application methods can be used for postemergence selective herbicidal compositions (with respect to the cultivated crops) and/or formulation thereof. In some embodiments, the herbicidal composition and/or formulation thereof is applied to the soil and/or plant parts of the cultivated crops and unwanted vegetation (if present) using this particular application method.

In some embodiments, the herbicidal composition and/or formulation thereof is applied to the target area using direct application methods. In these types of applications the target area typically is the area between the rows of cultivated crops, where the herbicidal composition and/or formulation thereof is being applied with little to no herbicidal composition and/or formulation thereof being applied to the crop foliage. Direct application methods are used for postemergence herbicidal compositions (with respect to the cultivated crops) where the unwanted vegetation may or may not have emerged in the target area. In some embodiments, directed application methods of the herbicidal composition and/or formulation are applied to the soil of the target area prior to emergence of the unwanted vegetation. In some embodiments, direct application method of the herbicidal composition and/or formulation thereof are applied to plant parts (e.g., leaves, stem, and/or flowers) of the unwanted vegetation present in the target area.

In some embodiments, the herbicidal composition and/or formulation thereof are applied to the target area using spot application methods, which apply the herbicidal composition and/or formulation thereof being applied to small target areas where unwanted vegetation is present or is at risk to be present. Spot application methods can be used for preplant, preemergence and postemergence (with repost to the crops) non-selective herbicidal compositions. In some embodiments, the composition is applied using spot application methods to the soil of the target area prior to emergence of the unwanted vegetation. In some embodiments, the composition is applied using spot application methods to plant parts of the already emerged unwanted vegetation.

The herbicidal composition and/or formulation thereof can be applied using any known agricultural equipment that is known in the art to carry out such function. Exemplary agricultural equipment includes but is not limited to sprayers (e.g., boom sprayer, spot sprayer, high volume spray truck, backpack sprayer, spray dusters), power-dusters, misters, blanket wipers, rope wick applicator, hand-held rope wick wiper, rotary and drop spreaders, and the like. A skilled person in the art would be aware of the agricultural equipment that would be suitable for a given herbicidal composition and/or formulation thereof and application method.

The core of cultivated plants includes plants such as cereals, fruit trees, fruit bushes, grains, legumes and combinations thereof. Exemplary crops include, but are not limited to rye, oats, maize, rice, sorghum, triticale, oilseed rape, rice, soybeans, sugar beet, sugar cane, turf, fruit trees, palm trees, coconut trees or other nuts, grapes, fruit bushes, fruit plants; beet, fodder beet, pomes, stone fruit, apples, pears, plums, peaches, almonds, cherries, and berries, for example strawberries, raspberries and blackberries; leguminous plants such as beans, lentils, peas, soybeans, peanuts; oil plants, for example rape, mustard, sunflowers; cucurbitaceae, for example marrows, cucumbers, melons; fibre plants, for example cotton, flax, hemp, jute; citrus fruit, for example oranges, lemons, grapefruit and mandarins; vegetables, for example spinach, lettuce, asparagus, cabbages, carrots, onions, tomatoes, potatoes, sweet potatoes, yams, paprika; as well as ornamentals, such as flowers, shrubs, broad-leaved trees and evergreens, for example conifers, cereals, wheat, barley, oats, winter wheat, spring wheat, winter barley, spring barley, triticale, cereal rye, winter durum wheat, spring durum wheat, winter oat, spring oat, fodder cereals, ray-grass, cocksfoot, fescue, timothy, grass for seed and grassland and any combination thereof.

The herbicidal compositions and formulations disclosed herein are able to control the growth of a wide variety of unwanted vegetation such as monocotyledonous and dicotyledonous weed species. In some embodiments, the unwanted vegetation to be controlled is monocotyledonous. Exemplary monocotyledonous genera include, but are not limited to, *Agrostis* spp., *Alopecurus* spp., *Apera* spp., *Avena* spp., *Brachiaria* spp., *Bromus* spp., *Digitaria* spp., *Echinochloa* spp., *Eleusine* spp., *Eriochloa* spp., *Leptochloa* spp., *Lolium* spp., *Ottochloa* spp., *Panicum* spp., *Paspalum* spp., *Phalaris* spp., *Poa* spp., *Rottboelia* spp., *Setaria* spp., *Sorghum* spp., *Commelina* spp., *Monochoria* spp., *Sagittaria* spp. and sedges such as *Cyperus* spp. and *Scirpus* spp. Exemplary monocotyledonous weed species include, but are not limited to, *Alopecurus myosuroides*, *Avena fatua*, *Brachiaria plantaginea*, *Bromus tectorum*, *Cyperus esculentus*, *Digitaria sanguinalis*, *Echinochloa crus-galli*, *Lolium perenne*, *Lolium multiflorum*, *Panicum miliaceum*, *Poa annua*, *Setaria viridis*, *Setaria faberi* and *Sorghum bicolor*.

In some embodiments, the unwanted vegetation is dicotyledonous. Exemplary genera of dicotyledonous weed species include, but are not limited to, *Abutilon* spp., *Ambrosia* spp., *Amaranthus* spp., *Chenopodium* spp., *Erysimum* spp., *Euphorbia* spp., *Fallopia* spp., *Galium* spp., *Hydrocotyle* spp., *Ipomoea* spp., *Lamium* spp., *Medicago* spp., *Oxalis* spp., *Plantago* spp., *Polygonum* spp., *Richardia* spp., *Sida* spp., *Sinapis* spp., *Solanum* spp., *Stellaria* spp., *Taraxacum* spp., *Trifolium* spp., *Veronica* spp., *Viola* spp. and *Xanthium* spp. Exemplary dicotyledonous weed species include, but are not limited to, *Abutilon theophrasti*, *Amaranthus retroflexus*, *Bidens pilosa*, *Chenopodium album*, *Euphorbia heterophylla*, *Galium aparine*, *Ipomoea hederacea*, *Kochia scoparia*, *Polygonum convolvulus*, *Sida spinosa*, *Sinapis arvensis*, *Solanum nigrum*, *Stellaria media*, *Veronica persica* and *Xanthium strumarium*.

Unwanted vegetation can also include plants which may be considered crop plants but which are growing outside a crop area ("escapes"), or which grow from seed left over from a previous planting of a different crop ("volunteers"). Such volunteers or escapes may be tolerant to certain other herbicides.

In some embodiments, the unwanted vegetation is selected from monocotyledonous weeds such as grasses (e.g., barnyard grass (*Echinochloa crus-galli*), large and smooth crabgrass (*Digitaria sanguinalis*, *Digitaria ischaemum*), goosegrass (*Eleusine indica*), bent grass (*Agrostis* spp.) and nimbleweed, and dicotyledonous weeds such as dandelion.

In some embodiments, the unwanted vegetation is a broadleaf species. Exemplary broad leaf weeds include, but are not limited to, foxtail (*Setaria* spp.), wild finger millet (*Eleusine* spp.), cough grass (*Digitaria* spp.), rye grass (*Lolium* spp.), shepherd's purse (*Capsella* bursapastories), fathen (*Chenopodium album*), double thorn (*Oxygonum sinuatum*), black bind weed (*Polygonum convolvulus*), Mexican marigold (*Tagetes minuta*), gallant soldier (*Galinsoga parviflora*), white charlock (*Raphanus* raphanastrium), blackgrass (*Alopecurus* spp.), meadow grass (*Poa* spp.), silky bent grass (*Apera* spp.), barnyard grass (*Echinochloa* spp.), cleavers (*Galium aparine*), common chickweed (*Stellaria media*), hedge mustard (*Sisymbrium officinale*), parsley-piert, scanted mayweed (*Matricaria chamomilla*), scentless mayweed (*Matricaria perforate*), mugwort (*Artemisia* spp.), milkweed (*Asclepias* spp.), Canada thistle (*Cirsium* spp.), velvetleaf (*Abutilon theophrasti*), pigweed (*Ama-*

*ranthus* spp.), buttonweed (*Borreria* spp.), canola, Indian mustard, *commelina* (*Commelina* spp), filaree (Eradium spp.), sunflower (helanthus spp.), morning glory (*Ipomoea* spp.) *kochia* (*Kochia scoparia*), mallow (*malva* spp.), wild buckwheat, smartweed (*Polygonum* spp.), purslane (*Portulaca* spp.), Russian thistle (*Salsola* spp.), sida (*sida* spp.), wild mustard (*Sinapis* arventis) and cocklebur (*Xanthium* spp.), field bindweed (*Convolvulus arvensis*), kudzu (*pueraria* sp shephard's-needle, shepherd's purse, volunteer oilseed rape (*Brassica napus*), wild radish (*Raphanus raphanistrum*), charlock (*Sinapis arvensis*), poppy (*Papaver rhoeas*), especially blackgrass, meadow grass, silky bent grass, cleavers, chickweed, mayweeds, poppy, charlock and volunteer oilseed rape.

In some embodiments, the unwanted vegetation is a narrowleaf species. Exemplary narrow leaf species include, but are not limited to, wild oat (*Avena fatua*), carpet grass (*Axonopus* spp.), downy brome (*Bromus* sectorum), crabgrass (*digitaria* spp.), barnyard grass (*Echinochloa crusgalli*), goose grass (*Eleusine indica*), annual ryegrass (*Lolium multiflorum*), rice (*Oryza sativa*), ottochloa (*Ottochloa nodosa*), bahia grass (*Paspalum notatum*), canary grass (*Phalaris* spp.), foxtails (*setaria* spp.), wheat (*Triticum aestivum*), corn (*Zea mays*), Bracheria (*Brachiaria* spp.), bermuda grass (*Cynodon dactylon*), yellow nutsedge (*Cyperus esculentus*), purple nutsedge (*C. rotundus*), quack grass (*Elymus repens*), lalang (*Imperata* cylinderica), perennial ryegrass (lotium *perenne*), guineagrass (*Panicum masimum*), dallisgrass (*Paspalum dilatatum*), reed (*Phragmites* app.), johnsongrass (*Sorghum halepense*) and cattail (*Typha* spp.).

In some embodiments, the unwanted vegetation is a glyphosphate-resistant weed species. Exemplary glyphosphate-resistant weed species include, but are not limited to, rigid ryegrass, horseweed (marestail), Italian ryegrass, common ragweed, palmer amaranth, waterhemp, goosegrass, hairy fleabane, broadleaf plantain, johnsongrass, and wild poinsettia In yet another embodiment, the undesired vegetation is selected from *Brassica napus, Brassica nigra, Arctotheca calendula, Fallopia convolvulus, Sinapis arvensis, Stellaria media, Sonchus oleraceus, Buglossoides arvense, Ipomoea lonchophylla, Crassula* spp., *Lamium* spp., *Lamium amplexicaule, Fumaria densiflora, Rumex* spp., *Emex australis, Chenopodium* spp., *Chenopodium album, Senecio* spp., *Senecio vulgaris, Centaurea cyanus Fumaria* spp., *Sisymbrium officinale, Melilotus indicus, Marrubium vulgare, Lythrum hyssopifolia, Mesembryanthemum* spp., *Sisymbrium orientale, Sisymbrium irio, Erodium botrys, Cerastium glomeratum, Matthiola longipetala, Echium plantagineum, Lepidium* spp., *Lactuca serriola, Sclerobliutum atriplicinum, Papaver hybridum, Carthamus lanatus, Anagallis arvensis, Capsella bursa-pastoris, Chondrilla juncea, Rumex* spp., *Onopordum acaulon, Juncus bufonius, Polygonum* spp., *Polygonum convolvulus, Polygonum patulum, Rapistrum rugosum, Silybum marianum, Vicia sativa, Lupinus* spp., *Carrichtera annua, Raphanus raphanistrum, Brassica tournefortii, Polygonum aviculare, Malva parviflora, Solanum nigrum, Amaranthus retroflexus, Galium aparine, Matricaria* spp., *Matricaria recutita, Matricaria chamomilla, Veronica* spp., *Papaver rhoeas, Viola arvensis, Ranunculus repens, Geranium* spp., volunteer oilseed rape, *Myosotis arvensis, Galium aparine, Brassica nigra, Capsella bursa-pastoris, Fallopia convolvulus, Matricaria* Spp., *Matricaria chamomilla, Viola* arvensis, *Stellaria media, Veronica* spp., *Lamium* spp., *Myosotis arvensis, Senecio vulgaris, Centaurea cyanus, Papaver rhoeas, Polygonum* spp., and *Chenopodium* spp.

In some embodiments, the above method is further combined with one or more additional methods to control unwanted vegetations. Exemplary methods include but are not limited to crop rotation, crop competition, introduction of natural predators, and/or mechanical control (e.g., hoeing, tillage, mowing, flooding, and/or smothering).

Particular embodiments of the subject matter described herein include:

1. A method of controlling the growth of undesired vegetation in a target area, the method comprising applying to the target area a herbicidally effective amount of a herbicidal composition comprising an oxaloacetate compound of formula (I):

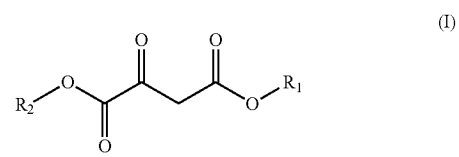

wherein $R_1$ and $R_2$ are independently selected from substituted or unsubstituted $C_1$-$C_8$ alkyl groups and $C_2$-$C_5$ alkenyl groups; or an agriculturally acceptable salt form thereof.

2. The method of embodiment 1, wherein $R_1$ and $R_2$ are independently selected from methyl, ethyl, n-propyl and iso-propyl.

3. The method of embodiment 1 or 2, wherein the compound is in an agriculturally acceptable salt form, wherein the salt is an alkali metal selected from lithium, sodium, potassium, cesium, and a combination thereof.

4. The method of any above embodiment, wherein the compound is in a sodium salt form.

5. The method of embodiment 1 or 2, wherein the compound is in an agriculturally acceptable salt form, wherein the salt is a divalent cation.

6. The method of embodiment 5, wherein the divalent cation is an alkaline earth metal selected from magnesium, calcium, and a combination thereof.

7. The method of embodiment 5, wherein the divalent cation is a transition metal selected from manganese, iron, cobalt, nickel, copper, zinc, and a combination thereof.

8. The method of any one of embodiments 5-7, wherein the compound and divalent cation are present in in a ratio of 2:1 (compound: divalent cation).

9. The method of any above embodiment, wherein the herbicidally effective amount ranges from about 0.005 to about 500 kilograms/hectare (kg/ha).

10. The method of any above embodiment, wherein the herbicidally effective amount ranges from about 5 to about 300 kg/ha.

11. The method of any above embodiment, wherein the herbicidal composition is applied at an effective herbicidal amount ranging from about 2.5 to about 5.25 g/plant.

12. The method of any above embodiment, wherein $R_1$ and $R_2$ are ethyl.

13. The method of any above embodiment, wherein the herbicidal composition is a non-selective herbicidal composition.

14. The method of embodiment 13, wherein the herbicidal composition is applied to the soil of the target area containing no crops of cultivated plants or containing crops of cultivated plants that have not yet emerged.

15. The method of embodiment 14, wherein the herbicidal composition is applied using a broadcast application method.

16. The method of any above embodiment, wherein the target area contains unwanted vegetation and crops of cultivated plants and the herbicidal composition is selectively applied to the plants of the unwanted vegetation to leave the crops of cultivated plants essentially uninjured.

17. The method of embodiment 16, wherein the herbicidal composition is applied to the target area using a directed application and/or a spot application method.

18. The method of any above embodiment, wherein the herbicidal composition is applied to the target area at a rate of from about 0.1 to about 100 gallons/acre.

19. The method of any above embodiment, wherein the herbicidal composition is applied at an effective herbicidal rate of from about 250 nM to about 525 nM per plant.

20. The method of any above embodiment, wherein the herbicidal composition is applied to the target area at a rate from about 137.5 to about 1650 lbs/acre based on plant densities ranging from about 25,000 to about 150,000 plants/acre.

21. The method of any above embodiment, wherein the herbicidal composition is used in an amount of from about 1 liter/hectare to about 1000 liters/hectare.

22. The method of any above embodiment, wherein the herbicidal composition is used in an amount from about 25 to about 300 kg/ha, based on planting densities ranging from about 10,000 to about 60,000 plants/ha.

23. The method of any above embodiment, wherein the target area is selected from an agricultural field, a garden, a lawn, an orchard, a vineyard, a planation, and a combination thereof.

24. The method of any above embodiment, wherein the herbicidal composition controls the growth of unwanted vegetation by at least 50% based on a given population of plants of unwanted vegetation present in the target area.

25. The method of any above embodiment, wherein the crops of cultivated plants are selected from the group consisting of barley, wheat, rye, oats, sorghum, triticale, cotton, oilseed rape, sunflower, maize, rice, soybeans, sugar beet, sugar cane, beet, fodder beet, pomes, stone fruit, apples, pears, plums, peaches, almonds, cherries, strawberries, raspberries, blackberries, beans, lentils, peas, soybeans, peanuts, rape, mustard, sunflowers, cotton, flax, hemp, jute, spinach, lettuce, asparagus, cabbages, carrots, onions, tomatoes, potatoes, sweet potatoes, yams, paprika, winter wheat, spring wheat, winter barley, spring barley, triticale, cereal rye, winter durum wheat, spring durum wheat, winter oat, spring oat, fodder cereals, ray-grass, cocksfoot, fescue, timothy, and combinations thereof.

26. The method of any above embodiment, wherein the unwanted vegetation is a monocotyledonous selected from the group of genera consisting of *Agrostis* spp., *Alopecurus* spp., *Apera* spp., *Avena* spp., *Brachiaria* spp., *Bromus* spp., *Digitaria* spp., *Echinochloa* spp., *Eleusine* spp., *Eriochloa* spp., *Leptochloa* spp., *Lolium* spp., *Ottochloa* spp., *Panicum* spp., *Paspalum* spp., *Phalaris* spp., *Poa* spp., *Rottboelia* spp., *Setaria* spp., *Sorghum* spp., *Commelina* spp., *Monochoria* spp., *Sagittaria* spp. and sedges such as *Cyperus* spp. and *Scirpus* spp.

27. The method of any one of embodiments 1-25, wherein the unwanted vegetation is a dicotyledonous selected from the group of genera consisting of *Abutilon* spp., *Ambrosia* spp., *Amaranthus* spp., *Chenopodium* spp., *Erysimum* spp., *Euphorbia* spp., *Fallopia* spp., *Galium* spp., *Hydrocotyle* spp., *Ipomoea* spp., *Lamium* spp., *Medicago* spp., *Oxalis* spp., *Plantago* spp., *Polygonum* spp., *Richardia* spp., *Sida* spp., *Sinapis* spp., *Solanum* spp., *Stellaria* spp., *Taraxacum* spp., *Trifolium* spp., *Veronica* spp., *Viola* spp. and *Xanthium* spp.

28. The method of any one of embodiments 1-25, wherein the unwanted vegetation comprises glyphosphate resistant weeds selected from the group consisting of rigid ryegrass, horseweed (marestail), Italian ryegrass, common ragweed, palmer amaranth, waterhemp, goosegrass, hairy fleabane, broadleaf plantain, johnsongrass, and wild poinsettia.

29. The method of any above embodiment, wherein the herbicide composition further comprises a pesticide.

30. The method of embodiment 29, wherein the pesticide is selected from fungicides, insecticides, acaricides, nematocide, molluscicide, miticides, plant growth regulators, and a combination thereof.

31. The method of any above embodiment, wherein the herbicide composition further comprises an herbicide component.

32. The method of any above embodiment, wherein the herbicidal composition is formulated into a formulation comprising one or more auxiliaries selected from extenders, carriers, solvents, surfactants (surface-active agents), stabilizers, anti foaming agents, anti-freezing agents, preservatives, antioxidants, viscosity modifiers, suspending agents, light absorbers, corrosion inhibitors, fragrances, pH-modifying substances, glidants, lubricants, plasticisers, complexing agents, colorants, thickeners, solid adherents, fillers, wetting agents, dispersing agents, lubricants, anticaking agents, deformers and diluents 33. The method of any above embodiment, wherein the herbicidal composition is in a form selected from a soluble liquid (SF), an emulsifiable concentrate (EC), a wettable powder (WP), a dry flowable (DF), a flowable (F), a water soluble powder (SP), an ultra-low-volume concentrate (ULV), a suspension concentrate (SC), an aqueous suspension (AS), a microencapsulated suspension (ME or MT), a capsule suspension (CS), a granule (G), or a pellet (P).

34. The method of any above embodiment, wherein the herbicidal composition is in the form of a ready to use formulation, a premix formulation or a tank mix formulation.

35. The method of any above embodiment, wherein the herbicidal composition is further combined with a fertilizer.

36. The method of embodiment 35, wherein the herbicidal composition is tank mixed in, impregnated in, absorbed onto, or coated onto the fertilizer.

EXAMPLES

Example 1: Determination of the Herbicidal Effects of the Sodium Salt of Diethyl Oxaloacetate A general screening of the herbicidal effect of the following compounds was carried out: Bayer Advanced® (100% Label Rate), Bayer Advanced® (10% Lable Rate), UTC (=untreated control), Diethyl Oxalacetate (10% w/w), Roundup® RTU (RTU=ready to use) (10% Label Rate) and Roundup® RTU (100% Label Rate). The results are shown in FIG. 1. Diethyl Oxalacetate (10% w/w) exhibited an herbicidal activity that was comparable to well-known herbicide products such as Roundup® and Bayer Advanced®.

That which is claimed is:

1. A method of controlling the growth of undesired vegetation in a target area, the method comprising applying to the target area a herbicidally effective amount of a herbicidal composition comprising an oxaloacetate compound of formula (I):

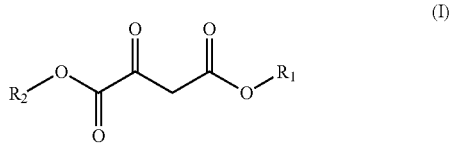

wherein R1 and R2 are each ethyl, and
wherein the unwanted vegetation comprises glyphosate resistant weeds selected from the group consisting of rigid ryegrass, horseweed (marestail), Italian ryegrass, common ragweed, palmer amaranth, waterhemp, goosegrass, hairy fleabane, broadleaf plantain, johnsongrass, and wild poinsettia.

2. The method of claim 1, wherein the compound is in an agriculturally acceptable salt form, wherein the salt is an alkali metal selected from lithium, sodium, potassium, cesium, and a combination thereof.

3. The method of claim 1, wherein the compound is in an agriculturally acceptable salt form, wherein the salt is a divalent cation selected from magnesium, calcium, and a combination thereof.

4. The method of claim 3, wherein the divalent cation is a transition metal selected from manganese, iron, cobalt, nickel, copper, zinc, and a combination thereof.

5. The method of claim 3, wherein the compound and divalent cation are present in a ratio of 2:1 (compound:divalent cation).

6. The method of claim 1, wherein the herbicidally effective amount ranges from about 0.005 to about 500 kilograms/hectare (kg/ha).

7. The method of claim 1, wherein the herbicidal composition is applied at an effective herbicidal amount ranging from about 2.5 to about 5.25 g/plant.

8. The method of claim 1, wherein the herbicidal composition is applied to the soil of the target area containing no crops of cultivated plants or containing crops of cultivated plants that have not yet emerged.

9. The method of claim 1, wherein the herbicidal composition is applied to the target area at a rate of from about 0.1 to about 100 gallons/acre.

10. The method of claim 1, wherein the herbicidal composition is applied at an effective herbicidal rate of from about 250 nM to about 525 nM per plant.

11. The method of claim 1, wherein the herbicidal composition is applied to the target area at a rate from about 137.5 to about 1650 lbs/acre based on plant densities ranging from about 25,000 to about 150,000 plants/acre.

12. The method of claim 1, wherein the herbicidal composition is used in an amount from about 25 to about 300 kg/ha, based on planting densities ranging from about 10,000 to about 60,000 plants/ha.

13. The method of claim 1, wherein the herbicidal composition controls the growth of unwanted vegetation by at least 50% based on a given population of plants of unwanted vegetation present in the target area.

14. The method of claim 1, wherein the crops of cultivated plants are selected from the group consisting of barley, wheat, rye, oats, sorghum, triticale, cotton, oilseed rape, sunflower, maize, rice, soybeans, sugar beet, sugar cane, beet, fodder beet, pomes, stone fruit, apples, pears, plums, peaches, almonds, cherries, strawberries, raspberries, blackberries, beans, lentils, peas, soybeans, peanuts, rape, mustard, sunflowers, cotton, flax, hemp, jute, spinach, lettuce, asparagus, cabbages, carrots, onions, tomatoes, potatoes, sweet potatoes, yams, paprika, winter wheat, spring wheat, winter barley, spring barley, triticale, cereal rye, winter durum wheat, spring durum wheat, winter oat, spring oat, fodder cereals, ray-grass, cocksfoot, fescue, timothy, and combinations thereof.

15. The method of claim 1, wherein the herbicide composition further comprises an herbicide component; and/or a pesticide selected from fungicides, insecticides, acaricides, nematocide, molluscicide, miticides, plant growth regulators, and a combination thereof.

16. The method of claim 1, wherein the herbicidal composition is in the form of a ready to use formulation, a premix formulation, a tank mix formulation, a soluble liquid (SF), an emulsifiable concentrate (EC), a wettable powder (WP), a dry flowable (DF), a flowable (F), a water soluble powder (SP), an ultra-low-volume concentrate (ULV), a suspension concentrate (SC), an aqueous suspension (AS), a microencapsulated suspension (ME or MT), a capsule suspension (CS), a granule (G), or a pellet (P).

17. The method of claim 1, wherein the herbicidal composition is further combined with a fertilizer, wherein the herbicidal composition is tank mixed in, impregnated in, absorbed onto, or coated onto the fertilizer.

* * * * *